(12) United States Patent
Lee

(10) Patent No.: US 7,431,493 B2
(45) Date of Patent: Oct. 7, 2008

(54) LIGHT GUIDING PLATE WITH BRIGHTNESS ENHANCEMENT MEANS AND LIQUID CRYSTAL DISPLAY

(75) Inventor: Hea-Chun Lee, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 11/447,535

(22) Filed: Jun. 5, 2006

(65) Prior Publication Data

US 2006/0221630 A1    Oct. 5, 2006

Related U.S. Application Data

(62) Division of application No. 10/191,415, filed on Jul. 10, 2002, now Pat. No. 7,056,005.

(30) Foreign Application Priority Data

Jul. 13, 2001    (KR) ................. 2001-42462

(51) Int. Cl.
*F21V 7/04* (2006.01)
(52) U.S. Cl. .................. 362/626; 362/607; 362/620; 349/64; 349/65
(58) Field of Classification Search .......... 362/626, 362/618, 624, 627, 606, 607; 349/65, 64
See application file for complete search history.

(56) References Cited

U.S. PATENT DOCUMENTS 4,373,282 A * 2/1983 Wragg ................. 362/625
5,128,842 A    7/1992 Kenmochi
5,359,691 A    10/1994 Tai et al.
5,390,436 A * 2/1995 Ashall ................. 362/618
5,420,761 A * 5/1995 DuNah et al. ........... 362/623
5,461,547 A * 10/1995 Ciupke et al. ........... 362/617
5,485,291 A * 1/1996 Qiao et al. ............ 349/62
5,521,796 A    5/1996 Osakada et al.
5,584,556 A * 12/1996 Yokoyama et al. ........ 362/625

(Continued)

FOREIGN PATENT DOCUMENTS

JP        3-189679       8/1991

(Continued)

OTHER PUBLICATIONS

Patent Abstracts of Japan, Publication No. 03-189679, Aug. 19, 1991, 1 p.

(Continued)

*Primary Examiner*—Ismael Negron
(74) *Attorney, Agent, or Firm*—MacPherson Kwok Chen & Heid LLP

(57) ABSTRACT

A liquid crystal display includes a lamp assembly, a light guiding plate, and liquid crystal display panel assembly. The light guiding plate includes a light input face for receiving light from the lamp assembly, a light reflection face with at least one brightness enhancement recess, a light output face opposite the light reflection face for emitting light towards the liquid crystal display panel assembly, and a plurality of side faces. The at least one brightness enhancement recess reflects toward the light output face light from the light input face and light reflected by the side faces.

9 Claims, 41 Drawing Sheets

U.S. PATENT DOCUMENTS

| | | | | |
|---|---|---|---|---|
| 5,598,280 | A * | 1/1997 | Nishio et al. | 349/62 |
| 5,600,455 | A | 2/1997 | Ishikawa et al. | |
| 5,627,926 | A | 5/1997 | Nakamura et al. | |
| 5,775,791 | A | 7/1998 | Yoshikawa et al. | |
| 5,838,403 | A | 11/1998 | Jannson et al. | |
| 5,854,872 | A | 12/1998 | Tai | |
| 5,887,964 | A | 3/1999 | Higuchi et al. | |
| 5,921,651 | A | 7/1999 | Ishikawa | |
| 5,961,198 | A * | 10/1999 | Hira et al. | 362/621 |
| 5,980,054 | A * | 11/1999 | Fukui et al. | 362/625 |
| 5,999,685 | A | 12/1999 | Goto et al. | |
| 6,104,854 | A * | 8/2000 | Masaki et al. | 362/609 |
| 6,123,431 | A | 9/2000 | Teragaki et al. | |
| 6,425,673 | B1 * | 7/2002 | Suga et al. | 349/65 |
| 6,454,452 | B1 * | 9/2002 | Sasagawa et al. | 362/561 |
| 6,652,109 | B2 | 11/2003 | Nakamura | |
| 6,663,253 | B2 * | 12/2003 | Murase et al. | 362/611 |
| 6,671,013 | B1 | 12/2003 | Ohkawa | |
| 6,752,505 | B2 | 6/2004 | Parker et al. | |
| 6,755,545 | B2 | 6/2004 | Lee | |
| 7,056,005 | B2 * | 6/2006 | Lee | 362/625 |

FOREIGN PATENT DOCUMENTS

| | | |
|---|---|---|
| JP | 4-136977 | 5/1992 |
| JP | 7-28061 | 1/1995 |
| JP | 8-29623 | 2/1996 |
| JP | 8-146223 | 6/1996 |
| JP | 8-262234 | 10/1996 |
| JP | 9-159831 | 6/1997 |
| JP | 10-20125 | 1/1998 |
| JP | 10-39302 | 2/1998 |
| JP | 10-227917 | 8/1998 |
| JP | 11-53922 | 2/1999 |
| JP | 11-109135 | 4/1999 |
| JP | 2000-314882 | 4/1999 |
| JP | 11-231797 | 8/1999 |
| JP | 2001-093316 | 9/1999 |
| JP | 2000-89033 | 3/2000 |
| KR | 199-8855 | 2/1999 |

OTHER PUBLICATIONS

Patent Abstracts of Japan, Publication No. 04-136977, May 11, 1992, 1 p.

Patent Abstracts of Japan, Publication No. 08-029623, Feb. 2, 1996, 1 p.

Patent Abstracts of Japan, Publication No. 08-146223, Jun. 7, 1996, 1 p.

Patent Abstracts of Japan, Publication No. 09-159831, Jun. 2, 1997, 1 p.

Patent Abstracts of Japan, Publication No. 10-020125, Jan. 23, 1998, 1 p.

Patent Abstracts of Japan, Publication No. 10-227917, Aug. 25, 1998, 1 p.

Patent Abstracts of Japan, Publication No. 11-053922, Feb. 26, 1999, 1 p.

Patent Abstracts of Japan, Publication No. 11-109135, Apr. 23, 1999, 1 p.

Patent Abstracts of Japan, Publication No. 11-231797, Aug. 27, 1999, 1 p.

Patent Abstracts of Japan, Publication No. 07-028061, Jan. 31, 1995, 1 p.

Patent Abstracts of Japan, Publication No. 08-262234, Oct. 11, 1996, 1 p.

Patent Abstracts of Japan, Publication No. 10-039302, Feb. 13, 1998, 1 p.

Patent Abstracts of Japan, Publication No. 2000-089033, Mar. 31, 2000, 1 p.

* cited by examiner

LIGHT GUIDING PLATE WITH BRIGHTNESS ENHANCEMENT MEANS AND LIQUID CRYSTAL DISPLAY

CROSS-REFERENCE TO RELATED APPLICATIONS

This application is a divisional of, and claims priority from, U.S. application Ser. No. 10/191,415, filed on Jul. 10, 2002 now U.S. Pat. No. 7,056,005, entitled "Light Guiding Plate, Method of Manufacturing the Same and Liquid Crystal Display Having the Light Guiding Plate," and claims priority of Korean Patent Application No. 2001-42462 filed Jul. 13, 2001, both of which are incorporated by reference herein in their entireties.

FIELD OF THE INVENTION

The present invention relates to a light guiding plate, a method of manufacturing the same and a liquid crystal display (LCD) having the light guiding plate, and more particularly, to a light guiding plate having a slimmed thickness and small volume, in which a structure of a light supplying unit for supplying a light having an optical distribution of a planar light source into a LCD panel is improved to accomplish an enhancement in brightness, a low power consumption, an enhancement in optical uniformity and minimization in light loss. Further, the invention relates to a method of manufacturing the light guiding plate and a liquid crystal display having the light guiding plate.

DESCRIPTION OF THE RELATED ART

Generally, an LCD is defined as a flat panel display that allows a user to recognize data processed in an information processing unit as characters, images and moving pictures using an optical property of liquid crystal in which light transmittance is varied depending on intensity of an applied electric field.

Compared with a traditional cathode ray tube (CRT), LCDs offer various advantages such as lighter weight and smaller volume, even though the LCDs have the same resolution and screen size as the CRT.

Such an LCD includes two sheets of very thin glass substrates facing each other and a liquid crystal layer interposed between the two glass substrates. In order to provide an electric field having a variable intensity in a small area unit, there is formed a plate-shaped electrode on an inner surface of one glass substrate while there are formed plural electrodes each having an area corresponding to a desired resolution on an inner surface of the other glass substrate. After that, the two substrates are assembled with a space therebetween and liquid crystal is injected into the space in which light transmittance in the liquid crystal is varied depending on the intensity of an electric field which is applied to the liquid crystal.

The liquid crystal layer functioning to control the light transmittance does not generate the light directly. This means that the light should be supplied toward the liquid crystal for performing the displaying operation. The light can be supplied from a natural light source or an artificial light source as a whole. In case of an artificial light source, the light is generated by consuming electric energy.

The LCD using a natural light source has a fatal defect in that it is impossible to perform the displaying operation in a place where there is no natural light. Therefore, LCDs using an artificial light have been actively developed and spread.

However, there are several problems in order to obtain a high quality image using an artificial light source. As an example, it is difficult to obtain a planar light source having an optical uniformity, i.e., a uniform brightness throughout the entire display area of the LCD.

FIG. 1 is a simplified cross-sectional view of an LCD panel provided with a CUT (Cold cathode fluorescent tube) lamp having an optical distribution of linear light source and it shows that the linear light generated from the CUT lamp 1 is converted into a planar light having an optical distribution of a planar light source.

Such a conversion from the linear light to the planar light is achieved by a light guiding plate 3.

The light guiding plate 3 is manufactured by using a synthetic resin-based material, and the light guiding plate 3 has a plate shape in a uniform thickness or a wedge shape whose thickness increases as it travels from one end to the other end.

Such a structure renders the light having an optical distribution of a linear light source and having been generated from a lamp 1 to be incident from a sidewall 3a of to the light guiding plate 3. The inputted light is reflected at an inner bottom surface 3b of the light guiding plate 3 and then outputted toward a direction of "A" through an upper surface 3c of the light guiding plate 3.

The light guiding plate 3 is appropriate for the planar light source but it is inappropriate for the light efficiency. In other words, the light guiding plate 3 has a disadvantage in that the light efficiency is lowered due to a light leakage.

In order to enhance the light efficiency of the light guiding plate 3, there are formed a plurality of reflection dots 3d in an outer bottom surface of the light guiding plate 3 by a silk screen method. However, these reflection dots 3d cause other problems.

As one problem, for example, when the light guiding plate 3 having the reflection dots 3d is used for a long time, an original color of the reflection dots 3d is changed. The color-changed reflection dots 3d generates a yellowing phenomenon in which when an incident light is reflected by the reflection dots 3d, the color of the reflected light is changed into a golden yellow. The yellowing phenomenon makes it difficult to display a desired color image.

As another problem, it is difficult to form the dots 3d having a size of 100 pm or less by using the silk screen method.

As still another problem, when forming the reflection dots 3d, a failure in a desired shape occurs frequently.

As further still another problem, when the light guiding plate is used for obtaining the planar light source, an optical distribution in the configuration of the planar light source can be obtained but the brightness distribution becomes non-uniform as indicated by reference number 5 in FIG. 4.

Thus, in order to overcome the low display performance occurring when the light guiding plate 3 is used, a diffusion plate 6 is provided on the light guiding plate 3 as shown in FIG. 2. Reference symbol "B" in FIG. 2 indicates a leakage light that is leaked through a side portion of the light guiding plate 3. The diffusion plate 6 serves to diffuse the incident light that is incident from the light guiding plate 3 such that the light irradiated from the light guiding plate 3 has an optical distribution indicated by a reference numeral 7 of FIG. 4. Further, the diffusion plate 6 functions to prevent the reflection dots 3d of the light guiding plate 3 from being visualized.

Thus, in the case that the diffusion plate 6 is used, the light irradiated from the light guiding plate 3 is scattered and thus a deficiency in the optical uniformity is somewhat overcome. However, the directionality of the light is lost during the light scattering. Therefore, after the light is incident into an LCD panel assembly 8, the amount of the light decreases or the visual angle is lowered.

In order to overcome this problem, as shown in FIG. 3, at least one prism sheet 9 is provided on the diffusion plate 6. The prism sheet 9 changes an optical distribution of the light diffused through the diffusion plate 6 into an optical distribution indicated by a reference numeral 10 in FIG. 4.

In the meantime, a part of the light that is incident into the light guiding plate 3 is reflected by the light guiding plate 3 and is directed toward the LCD panel assembly 8 but another part is leaked through the bottom surface of the light guiding plate 3 as shown in FIGS. 1 through 3. In FIG. 1, a reference symbol "C" indicates a leakage light leaked toward the outside.

Thus, if a part of the light is leaked through the bottom surface of the light guiding plate 3, a light directed toward the LCD panel assembly 8 is insufficient naturally, so that an amount of the brightness that is necessary to display an image definitely is lacking.

In order to overcome this problem, as shown in FIG. 2, there is further provided a reflection plate 11 for reproducing the leakage light leaked from the light guiding plate 3 while having a high reflectivity below the light guiding plate 3.

Thus, in the case that the light guiding plate and the reflection dots 3d are used, the aforementioned diffusion plate 6, the prism sheet 9, the reflection plate 11 and the like are additionally needed, so that the production costs increase substantially. The diffusion plate 6, the prism sheet 9 and the reflection plate 11 are stacked and received in the named order in a receiving container (not shown), to thereby compose a so-called backlight assembly.

While the aforementioned diffusion plate 6, the prism sheet 9 and the reflection plate 11 enhance the optical uniformity of the light, a considerable amount of the light generated from the lamp 1 such as a CCFT lamp is consumed.

Thus, in order to obtain a sufficient brightness necessary for the displaying of an image in the LCD, the amount of the light generated from the CCFT lamp I should increase considering a lost amount of the light in the backlight assembly. This means a substantial increase in power consumption.

Furthermore, the diffusion plate 6, the prism sheet 9 and the reflection sheet 11 act to increase the thickness of the LCD, as well as time spent in the assembly of the LCD and its production costs.

SUMMARY OF THE INVENTION

Accordingly, it is a first object of the present invention to provide a, light guiding plate allowing a light generated from a lamp to have an optical distribution of a planar light source while allowing the light to be incident toward an LCD panel assembly with a high brightness.

It is a second object of the invention to provide a method for manufacturing a light guiding plate in which brightness and uniformity in the brightness are enhanced.

It is a third object of the invention to provide an LCD in which a structure of a light guiding plate is altered, thereby substantially enhancing the brightness while diminishing the thickness and the volume of the light guiding plate.

To accomplish the first object of the invention, there is provided a light guiding plate disposed below an LCD panel. The light guiding plate allows a light having an optical distribution of a planar light source to be supplied toward the LCD panel. The light guiding plate includes a light input face, into which the light is inputted, and a light reflection face, which is adjacent to the light input face. The light reflection face has at least one brightness enhancement recess and a light output face that faces the light reflection face. The brightness enhancement recess is formed at the light reflection face of a body of the light guiding plate. The body of the light guiding plate includes at least two side faces having the light input face. The brightness enhancement recess reflects toward the light output face a light that is inputted through the light input face and is reflected by the side faces, to enhance brightness.

To accomplish the first object of the present invention, there is also provided a light guiding plate disposed below an LCD panel. The light guiding plate allows a light having an optical distribution of a planar light source to be supplied toward the LCD is panel. The light guiding plate has a light input face, into which the light is inputted, a light reflection face, which is adjacent to the light input face, and a light output face facing the light reflection face. The light output face includes at least one light concentration pattern formed in succession in a first direction. The light concentration pattern has a profile in a prism shape.

To accomplish the second object of the present invention, there is provided a method for manufacturing a light guiding plate. In the above method, a photosensitive film is coated on a base substrate. The photosensitive film is exposed by using lights having various wavelengths and then developed to form at least one polygonal pyramid shaped recess with a certain depth from the surface of the photosensitive film. A metal material is deposited on the photosensitive film including the polygonal pyramid-shaped recess to form a metal substrate and then the metal substrate is separated from the photosensitive film. The separated metal substrate is loaded into an inner space between an upper mold and a lower mold, and then a material for forming the light guiding plate is supplied into the inner space.

To accomplish the second object of the present invention, there is also provided a method for manufacturing a light guiding plate with an enhanced brightness. In the above method, a photosensitive film is coated on a base substrate to a selected thickness. The photosensitive film is partially exposed and developed to partially removing an exposed portion of the photosensitive film, thereby forming a protruded portion at a non-exposed portion of the photosensitive film. At least one polygonal pyramid-shaped recess is formed at a remaining portion of the photosensitive film except for the protruded portion. A metal material is deposited on the protruded portion and the recess to form a metal substrate. The metal substrate is separated from the photosensitive film. The separated metal substrate is loaded into an inner space between an upper mold and a lower mold and then a material for forming the light guiding plate is supplied into the inner space.

To accomplish the second object of the present invention, there is also provided a method for manufacturing a light guiding plate with an enhanced brightness. In the above method, a first injection molding substrate includes an upper mold having a prism-shaped pattern therein. The prism-shaped pattern has a V-shaped profile. A plurality of prism-shaped patterns are repeatedly formed in parallel with a first direction. A material for the formation of the light guiding plate is injected into a space which is formed by coupling the upper mold and a lower mold of the first injection molding substrate to form a first light guiding plate on which a first light concentration pattern is formed. A second injection molding substrate includes an upper mold having a triangular pyramid pattern therein. The triangular pyramid pattern having a V-shaped profile and the triangular pyramid patterns are repeatedly formed in parallel with a second direction which is different from the first direction. The first light guiding plate is placed at the lower mold. The upper mold and the lower mold are coupled to each other, and a material for the formation of a second light guiding plate is supplied into a to space between the second injection molding substrate and an upper face of the first light guiding plate to form the second light guiding plate.

To accomplish the third object of the present invention, there is provided an LCD. The LCD includes: an LCD panel assembly for displaying an image by controlling a liquid crystal layer; and a backlight assembly. The backlight assembly includes: (i) a lamp assembly for supplying a light, (ii) a light guiding plate having: a light input face into which the light is inputted; a light reflection face having at least one brightness enhancement means; and a light output face allowing the light to be outputted from the brightness enhancement means, wherein the brightness enhancement recess reflects toward the light output face the light which is inputted through the light input face and is reflected by the side faces, to enhance brightness, (iii) a light path control film facing the light output face and (iv) a reflection plate formed below the light guiding plate.

To accomplish the third object of the present invention, there is also provided an LCD. The LCD comprises: an LCD panel assembly for displaying an image by controlling a liquid crystal layer; and a backlight assembly. The backlight assembly includes: (i) a lamp assembly for supplying a light, and (ii) a light guiding plate having: a light input face into which the light is input; a brightness enhancement means for reflecting at least one a second light having a different progress direction than an input direction of the light toward the LCD panel assembly to enhance brightness; a light reflection face having a brightness enhancement protrusion for preventing the light from being leaked; and a light output face allowing the light to be outputted from the brightness enhancement means and having a brightness concentration means formed in the light output face.

BRIEF DESCRIPTION OF THE DRAWINGS

The above objects and other advantages of the present invention will become more apparent by describing in detail the preferred embodiments thereof with reference to the accompanying drawings, in which.

DETAILED DESCRIPTION OF THE PREFERRED EMBODIMENTS

Hereinafter, there are in detail described a light guiding plate, a method for manufacturing the light guiding plate and an LCD provided with the light guiding plate with reference to the accompanying drawings.

Figure 5:
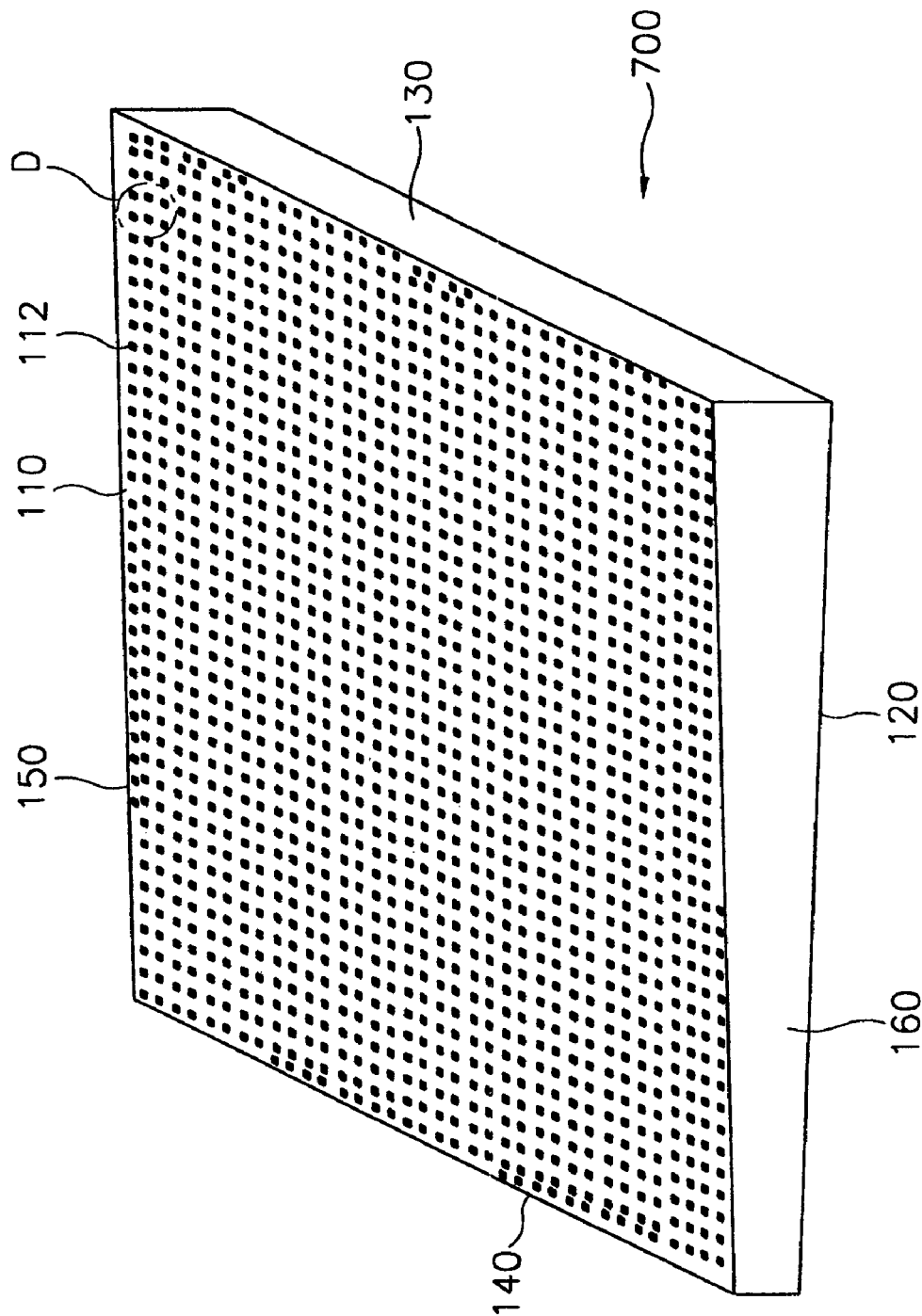
FIG. 5 is a rear perspective view of the light guiding plate in accordance with the first embodiment of the present invention.

FIG. 5 is a rear perspective view of a light guiding plate 700 that supplies a planar type light to an LCD panel in accordance with a first embodiment of the present invention.

Embodiment 1

Referring to FIG. 5, a light guiding plate 700 has a structure of a flat plate type parallelepiped having no difference in thickness, or a wedge type parallelepiped whose thickness increases as it travels from one end to the other end, as it is viewed as a whole.

The present embodiment describes a wedge type light guiding plate.

Since the wedge type light guiding plate has a similar shape to the hexahedron, the wedge type light guiding plate has an upper face, a bottom face facing the upper face, and at least three side faces enclosing the upper face and the bottom face.

In FIG. 5, there is shown a light guiding plate 700 having four side faces.

For the convenience of the description, an upper face which is arranged to face an LCD panel is defined as a light output face 120, a bottom face facing the light output face 120 is defined as a light reflection face 110.

Further, among the four side faces of the light guiding plate 700, a side face where a lamp is established is especially defined as a light input face 130 and the remaining three side faces are respectively defined as a first side face 140, a second side face 150 and a third face 160.

At this time, as shown in FIG. 5, a plurality of brightness enhancement recesses 112 are formed throughout the entire surface of the light reflection face 110.

Each brightness enhancement recess 112 is in a matrix shape and their surface areas are varied depending on position of a lamp established adjacent to the light input face 130.

Specifically, the density of the brightness enhancement recess 112 is decided considering the area of the light input face 130.

More specifically, the density of the brightness enhancement recess 112 increases as it travels from the light input face 130 to the first side face 140 facing the light input face 130.

Figure 6:
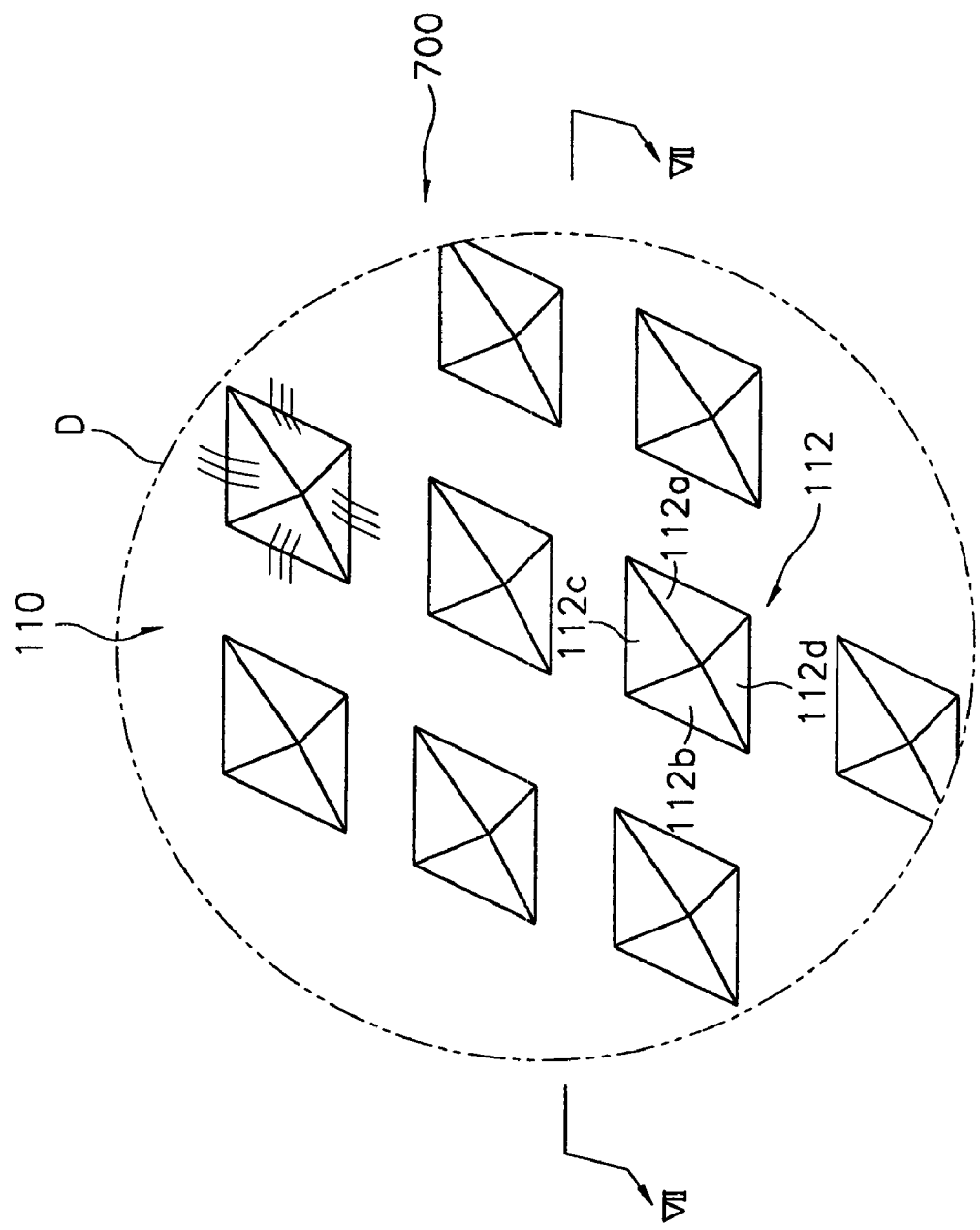
FIG. 6 is an enlarged view of the portion "D" in FIG. 5.
Figure 7:
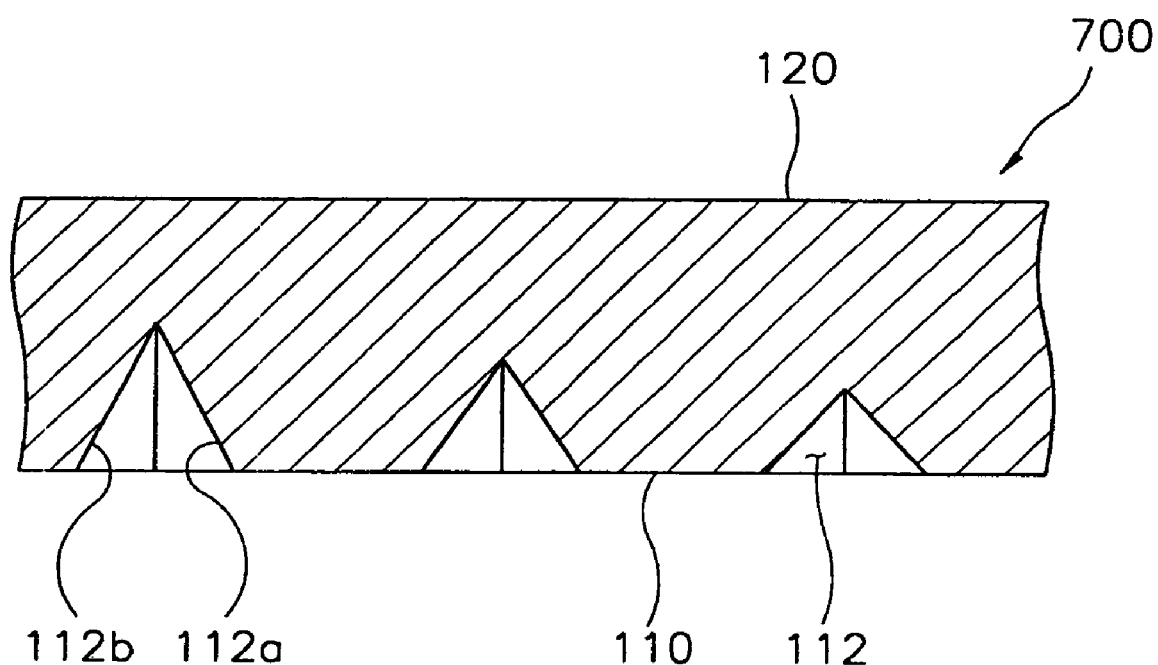
FIG. 7 is a sectional view taken along the line VII-VII of FIG. 6.

FIGS. 6 and 7 show the brightness enhancement recesses 112 formed in the light reflection face 110 in more detail.

For instance, as shown in FIG. 6, which is an enlarged view of the section "D" from FIG. 5, the brightness enhancement recess 112 have a pyramidal prism shape having four side faces.

While the present embodiment shows and describes a case of the pyramidal shaped recess as the brightness enhancement recess 112, a polygonal cone having at least three side faces or a non-angular shaped cone can be selectively used.

Hereinafter, the four side faces of each of the brightness enhancement recess 112 is respectively defined as a first side face 112a, a second side face 112b, a third side face 112c and a fourth side face 112d.

It is noted that the first face to third side face 140, 150, 160 and the light input face 130 of the light guiding plate 700 correspond to the first face to fourth side face 112a, 112b, 112c, 112d of the brightness enhancement recess 112.

More specifically, the light input face 130 of the light guiding plate 700 faces the first side face 112a of the brightness enhancement recess 112, the first side face 140 of the light guiding plate 700 faces the second side face 112b of the brightness enhancement recess 112, the second side face 150 of the light guiding plate 700 faces the third side face 112c of the brightness enhancement recess 112 and the third side face 160 of the light guiding plate 700 faces the fourth side face 112d of the brightness enhancement recess 112 to the highest degree.

Thus, the four side faces 130, 140, 150, 160 of the light guiding plate 700 match with the four side faces 112a, 112b, 112c, 112d of the brightness enhancement recess 112, so that brightness is substantially enhanced.

Figure 8:
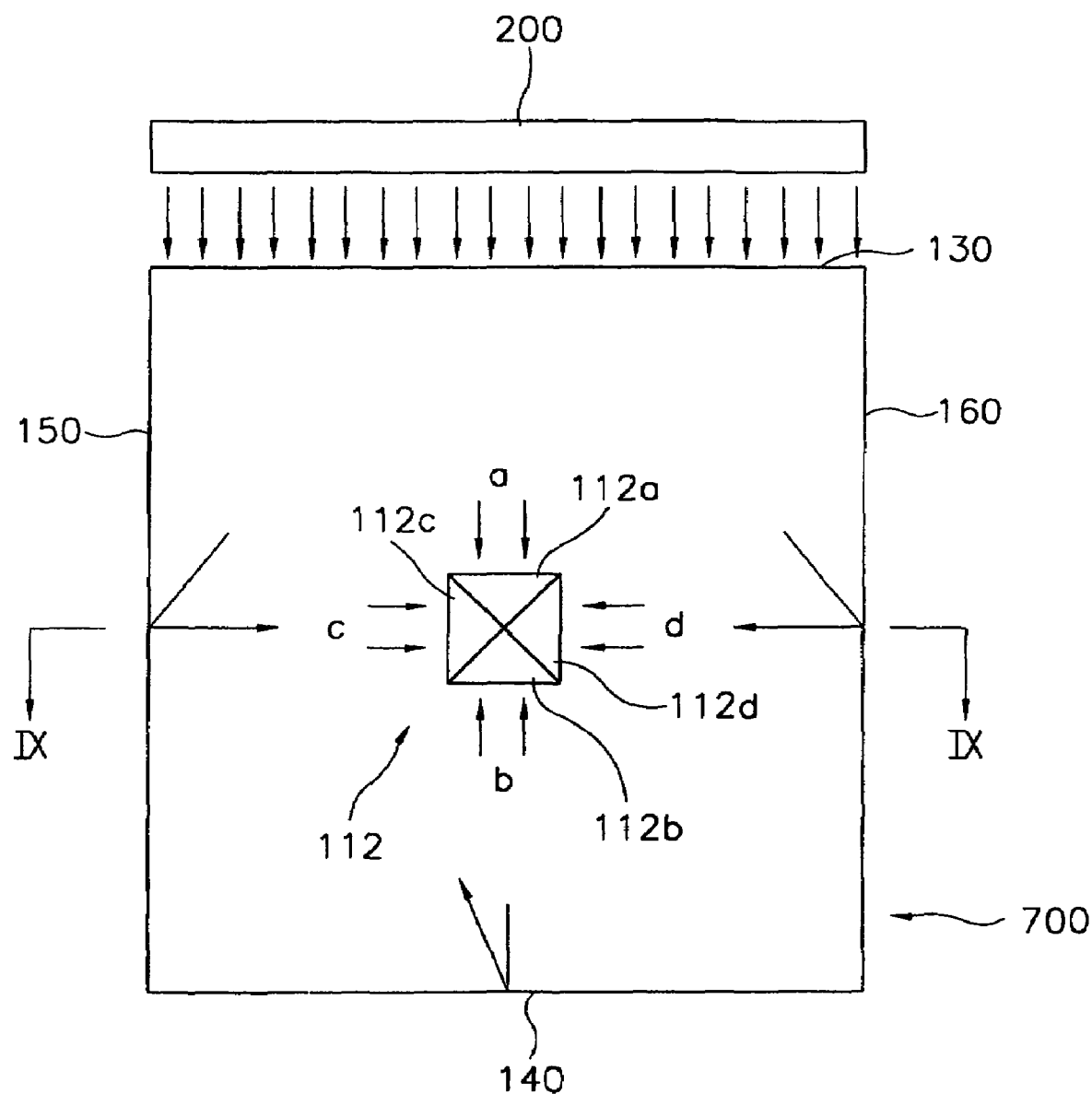
FIG. 8 is a conceptive view for describing an operation of the brightness enhancement recess in accordance with the first embodiment of the present invention.
Figure 9:
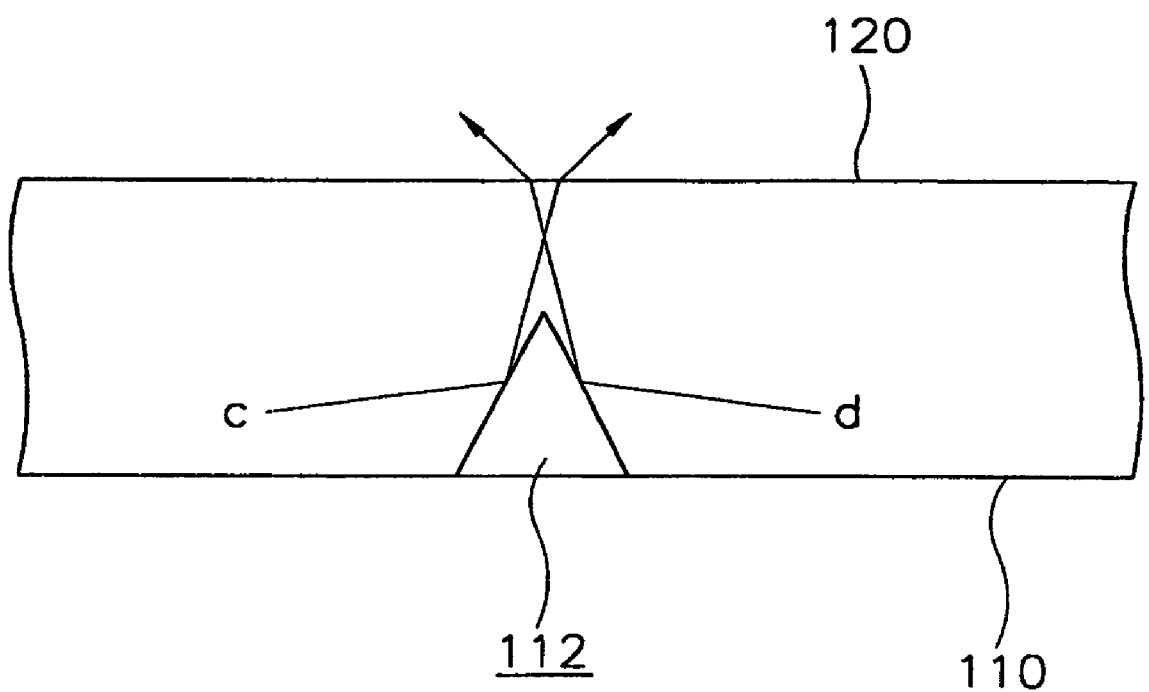
FIG. 9 is a conceptive view for describing an optical path of the brightness enhancement recess in accordance with the first embodiment of the present invention.

Specifically, referring to FIGS. 8 and 9, the light generated from the lamp 200 is incident toward "a" direction through the light input face 130 of the light guiding plate 700 and is then reflected to have an optical distribution of a planar light source by the light reflection face 110 shown in FIG. 9.

At this time, the light that has been incident through the light input face 130 from the lamp 200 has multiple progressive directions of "b" direction, which is a direction of a light reflected by the first side face 140 of the light guiding plate 700 facing the light input face 130, "c" direction, which is a direction of a light reflected by the second side face 150, which is placed adjacent to the light input face 130 and "d" direction, which is to a direction of a light reflected by the third side face 160.

Here, if the brightness enhancement recess 112 does not exist, the light that is input along the "a" direction, is reflected by the light reflection face 110 toward the light output face 120. However, although the lights of the "b", "c" and "d" directions are also reflected by the light reflection face 110 like the light of "a" direction, they do not have a progressive direction necessary for the displaying of an image, so that they are wasted.

Meanwhile, if the brightness enhancement recess 112 is formed as in the present embodiment of the present invention, the lights that are input along the "a", "b", "c" and "d" directions, are reflected by the first to the fourth side faces 112a to 112d of the brightness enhancement recess 112, and the reflected lights are directed towards the light output face 120.

The accompanying drawing of FIG. 9 shows that the lights that are inputted in the "b", "c" and "d" directions as wells as in the "a" direction are reflected by the brightness enhancement recess 112 and then are outputted to the outside of the light guiding plate through the light output face 120.

According to a simulation result, if the brightness enhancement recess 112 capable of utilizing the lights in the "b", "c" and "d" directions as well as the "a" direction 5 is formed, the brightness is enhanced by 10% or more.

The first side face 112a to the fourth side face 112d of the brightness enhancement recess 112 shown in FIG. 6 to FIG. 9 are mirror face-processed. This means that when the incident lights are reflected by the first side face 112a to the fourth side face 112d of the brightness enhancement recess 112, these lights are mirror face-reflected.

Figure 10:
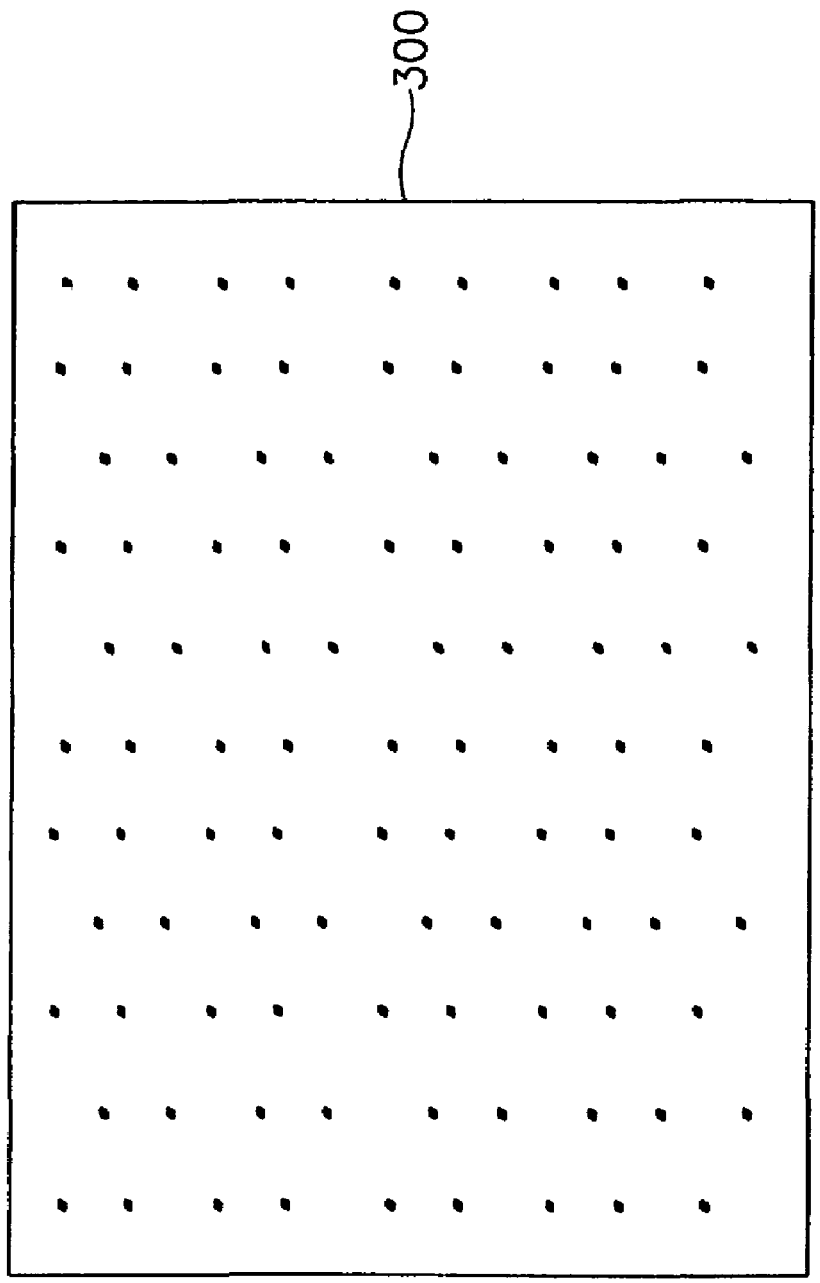
FIG. 10 is a conceptive view for showing a mirror reflection result due to the to brightness enhancement recess in accordance with the first embodiment of the present invention.

Referring to FIG. 10, when the incident lights are reflected by the first side face 112a to the fourth side face 112d of the brightness enhancement recess 112, a displayed picture 300 is viewed brighter or much more dark locally. In this case, a user's eye fatigue increases, so that the display characteristic is lowered.

FIGS. 11A to 11G show a method for forming the brightness enhancement recess 112 of the first embodiment in the light reflection face 110 of the light guiding plate 700.

Figure 11A:
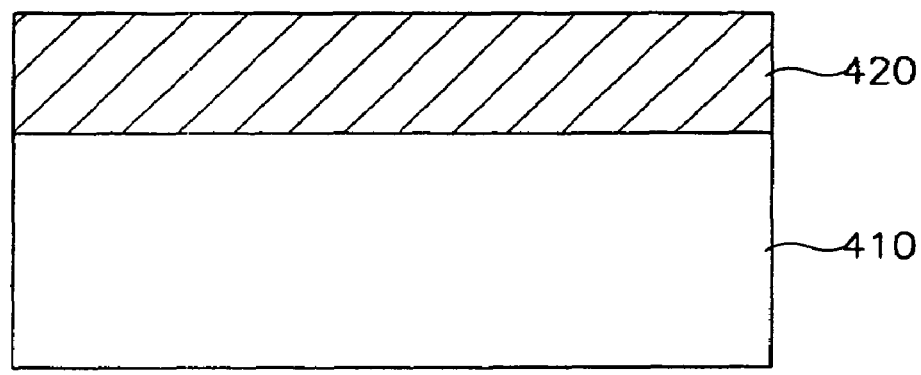
FIGS. 11A through 11G are views for illustrating a manufacturing method of the brightness enhancement recess in accordance with the first embodiment of the present invention.
Figure 11B:
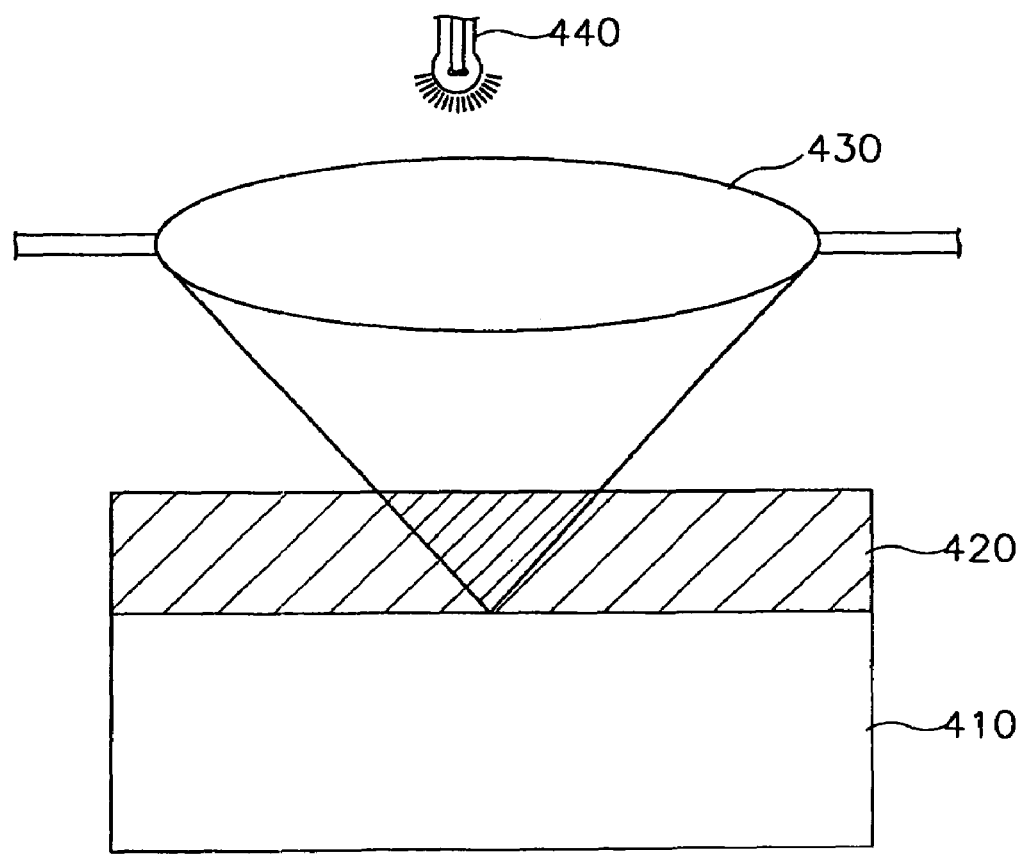

Referring to FIG. 11A, a thick photoresist film (or photosensitive film) 420 is formed on a base substrate 410 by a spin coating method.

After that, as shown in FIG. 11 B, a micro lens 430 for concentrating an incident light is aligned over the photoresist film 420.

Thereafter, the light generated from a light source is emitted onto the micro lens 430 to pass through the micro lens 430. Then, the light passing through the micro lens 430 is irradiated onto the photoresist film 420 to partially expose the photoresist film 420 to the light.

The light passing through the micro lens 430 has a quadrangular pyramid shape whose area decreases gradually as it goes from the micro lens 430 to a focused portion of the photoresist film 420. Thus, the photoresist film 420 is exposed to have the same profile as the light irradiated onto the micro lens 430.

Figure 11C:
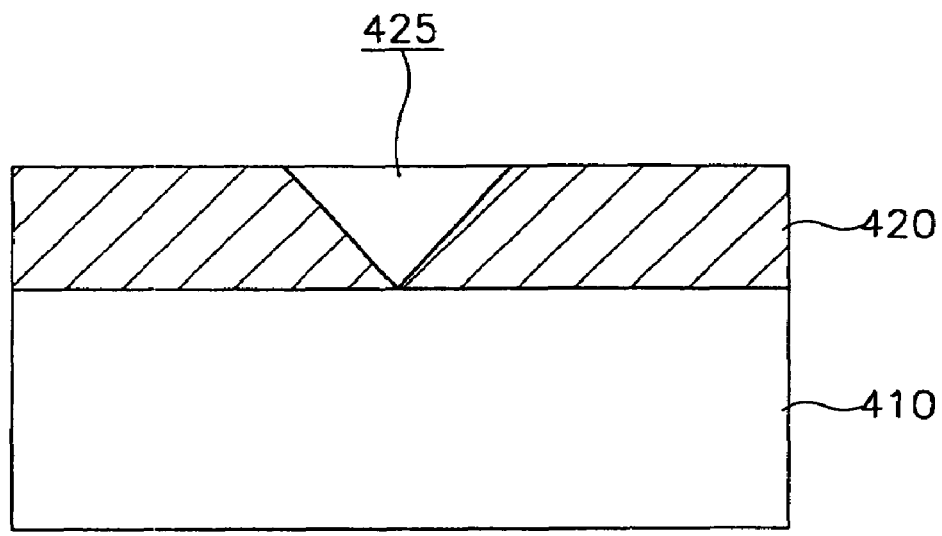
Figure 11D:
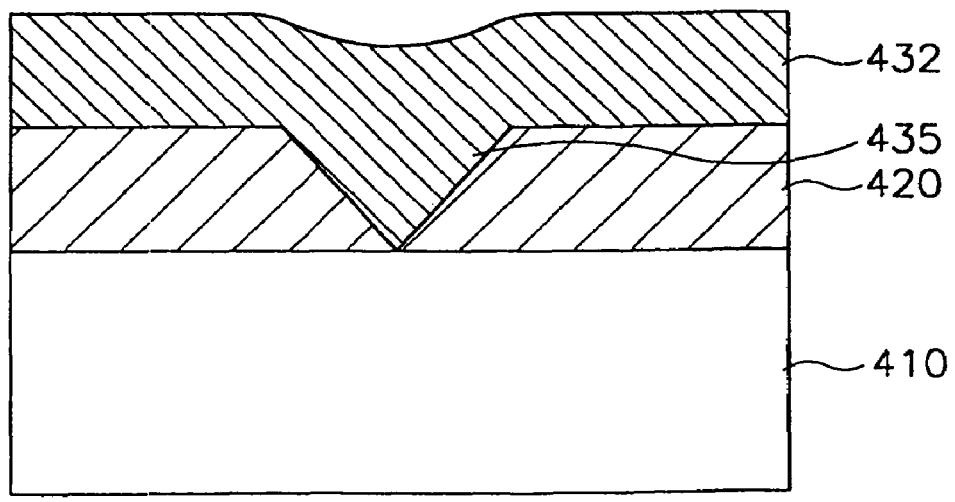
Figure 11E:
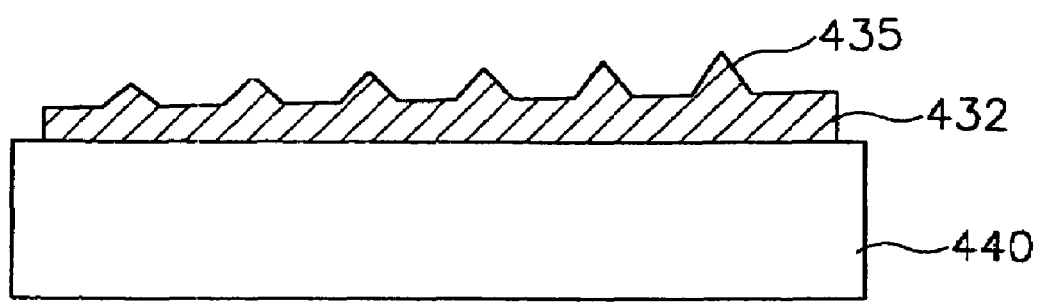
Figure 11F:
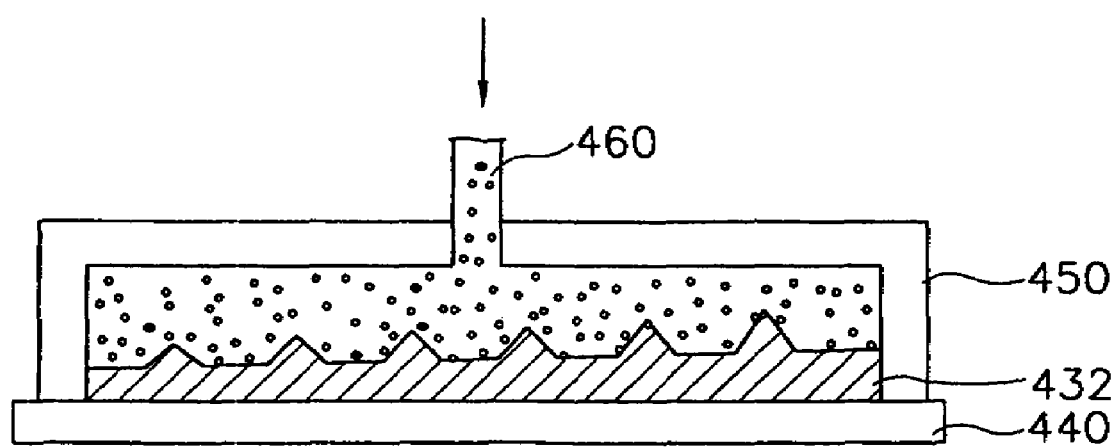
Figure 11G:
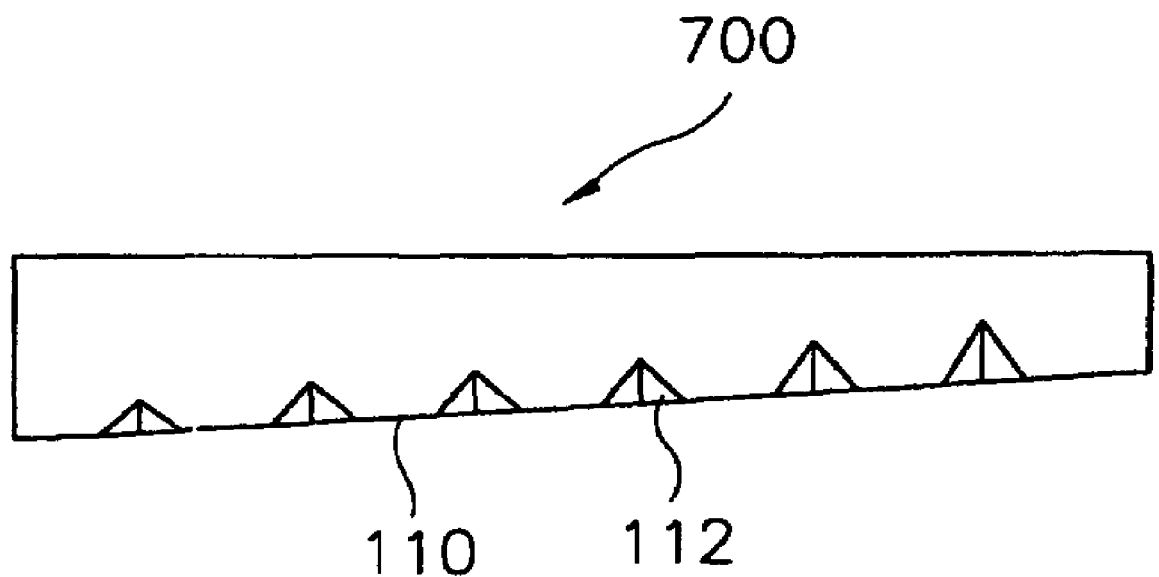

Subsequently, as shown in FIG. 11C, the exposed photoresist film 420 is developed and thus a photoresist recess pattern 425 having the same profile as the brightness enhancement recess 112 is formed.

Figure 1:
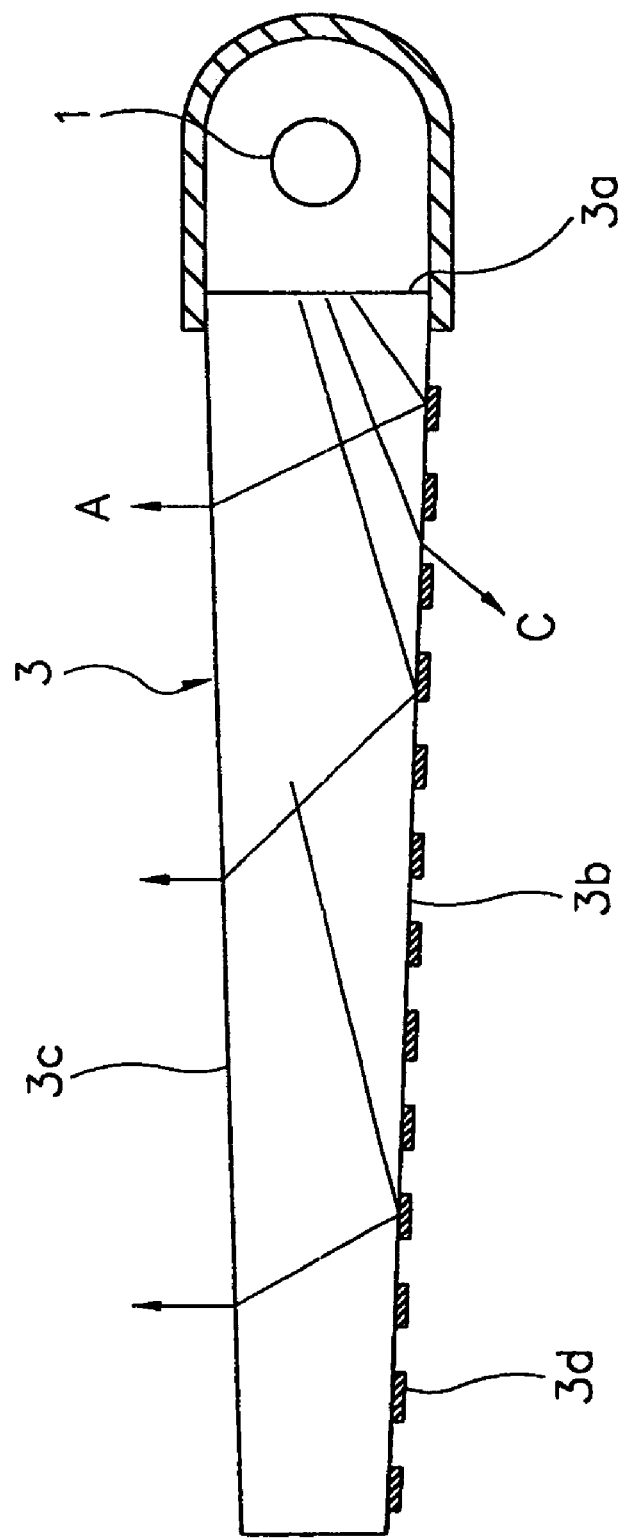
FIG. 1 is a schematic view for describing operation of the light guiding plate and the reflection dots in a conventional LCD.
Figure 2:
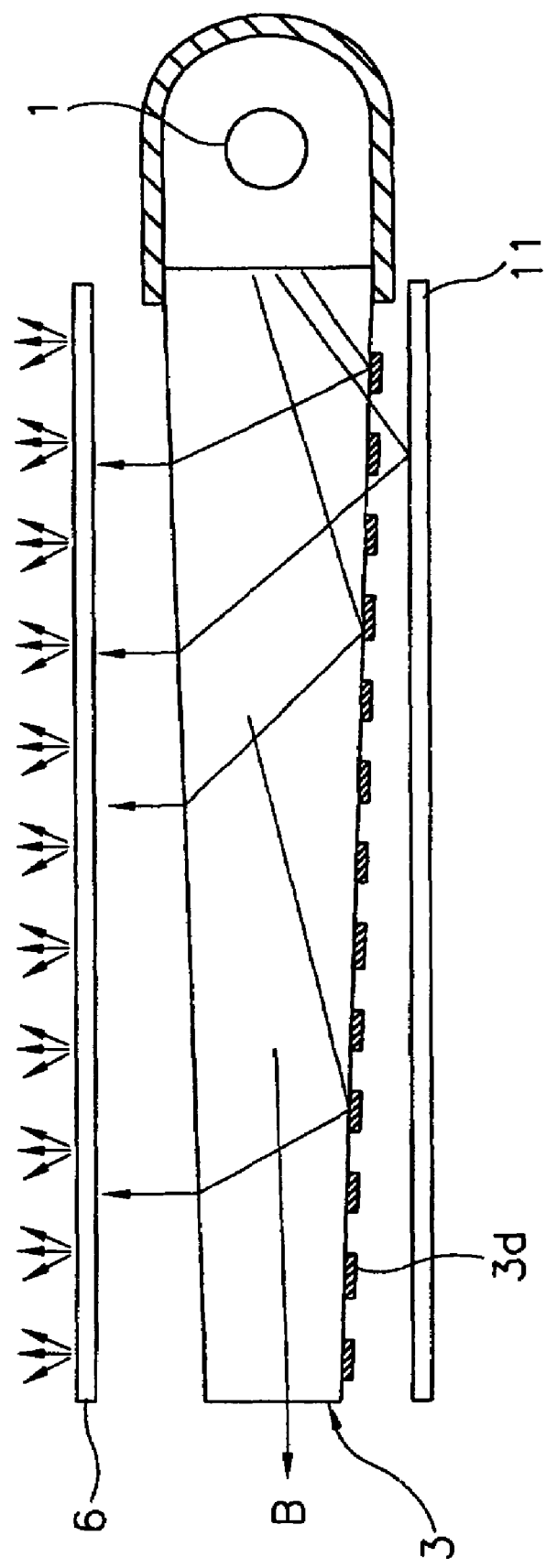
FIG. 2 is a schematic view for describing operation of the diffusion sheet for diffusing light irradiated from the light guiding plate in a conventional LCD.
Figure 3:
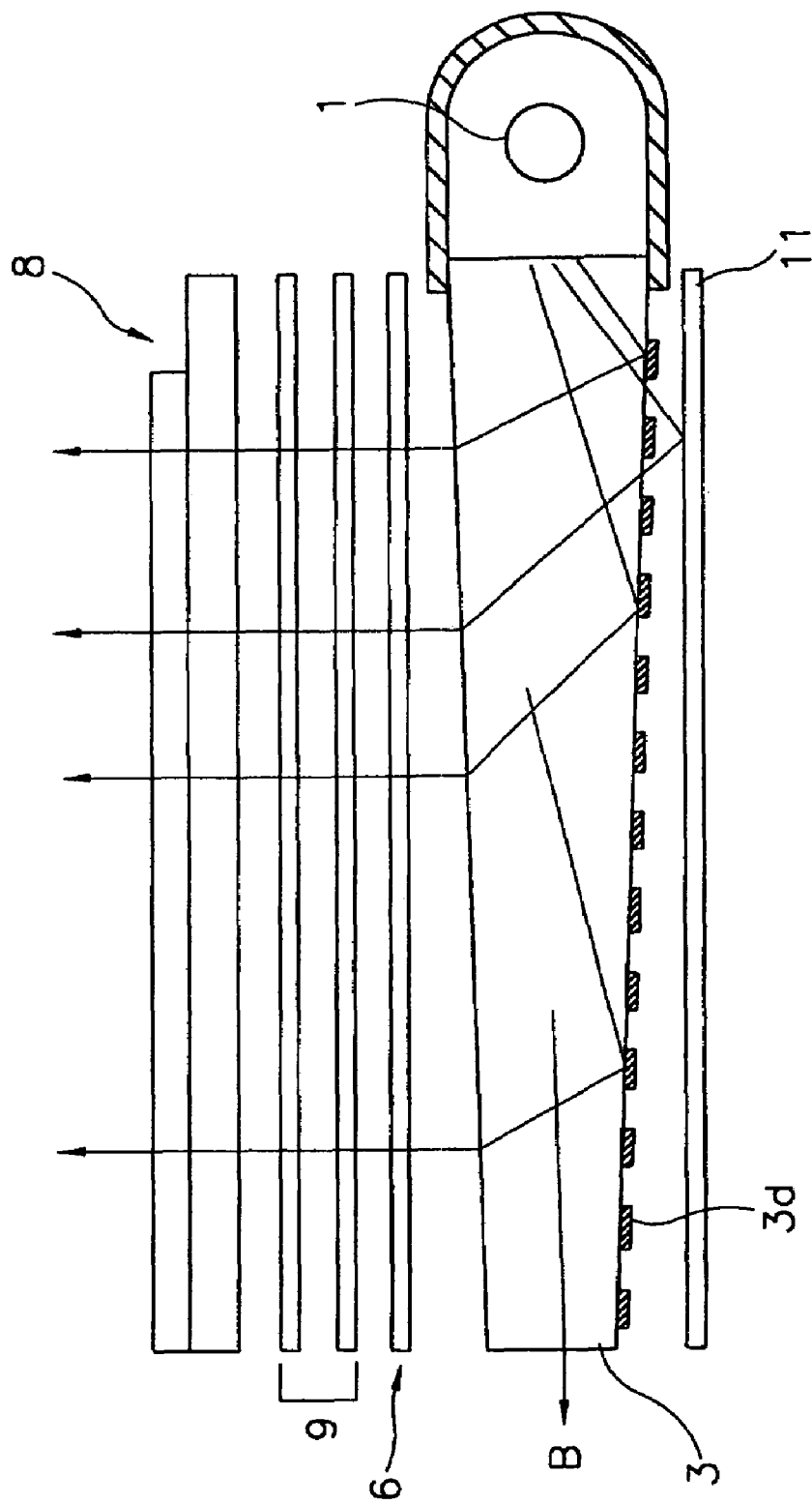
FIG. 3 is a schematic view for describing operation of an optical sheet including the diffusion sheet and the prism sheet, and the reflection plate in a conventional LCD.
Figure 4:
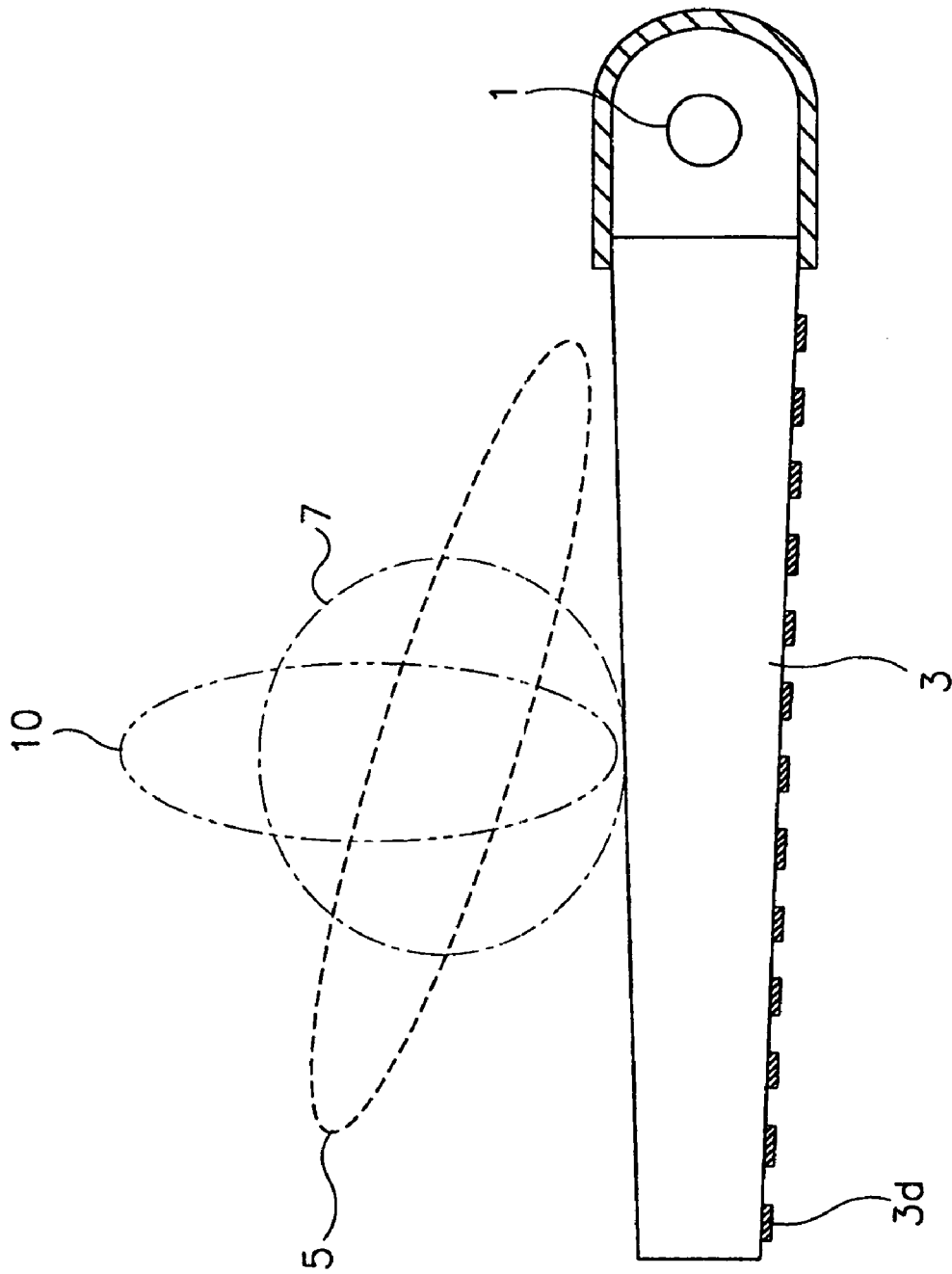
FIG. 4 is a schematic view for describing optical distributions of the light irradiated respectively from the conventional light guiding plate, the diffusion sheet and the prism sheet.

Afterwards, as shown in FIG. 1D, a metal layer 432 is deposited on the patterned photoresist film including the photoresist recess pattern 425 to a certain thickness by a sputtering method. The deposited metal layer 432 serves as a metal substrate having a metal protrusion 435 corresponding to the photoresist recess pattern 425.

Thereafter, as shown in FIG. 11 E, the patterned photoresist film 420 attached to the metal layer 432 is removed by an ashing process. Next, the metal layer 432 is attached on a lower mold 440 by turning upside down the metal substrate 432 of FIG. 11 D for the formation of the light guiding plate.

Afterwards, as shown in FIG. 11 F, an upper mold 450 for the formation of the light guiding plate is coupled to the lower mold 440. Then, a liquid material 460 for the formation of the light guiding plate is injected into a space between the lower mold 440 and the upper mold 450 through an injection hole of the upper mold 450. Thus, the light guiding plate 700 having the brightness enhancement recess 112 arranged at the light reflection face 110 is manufactured as shown in FIG. 11 G.

Figure 12:
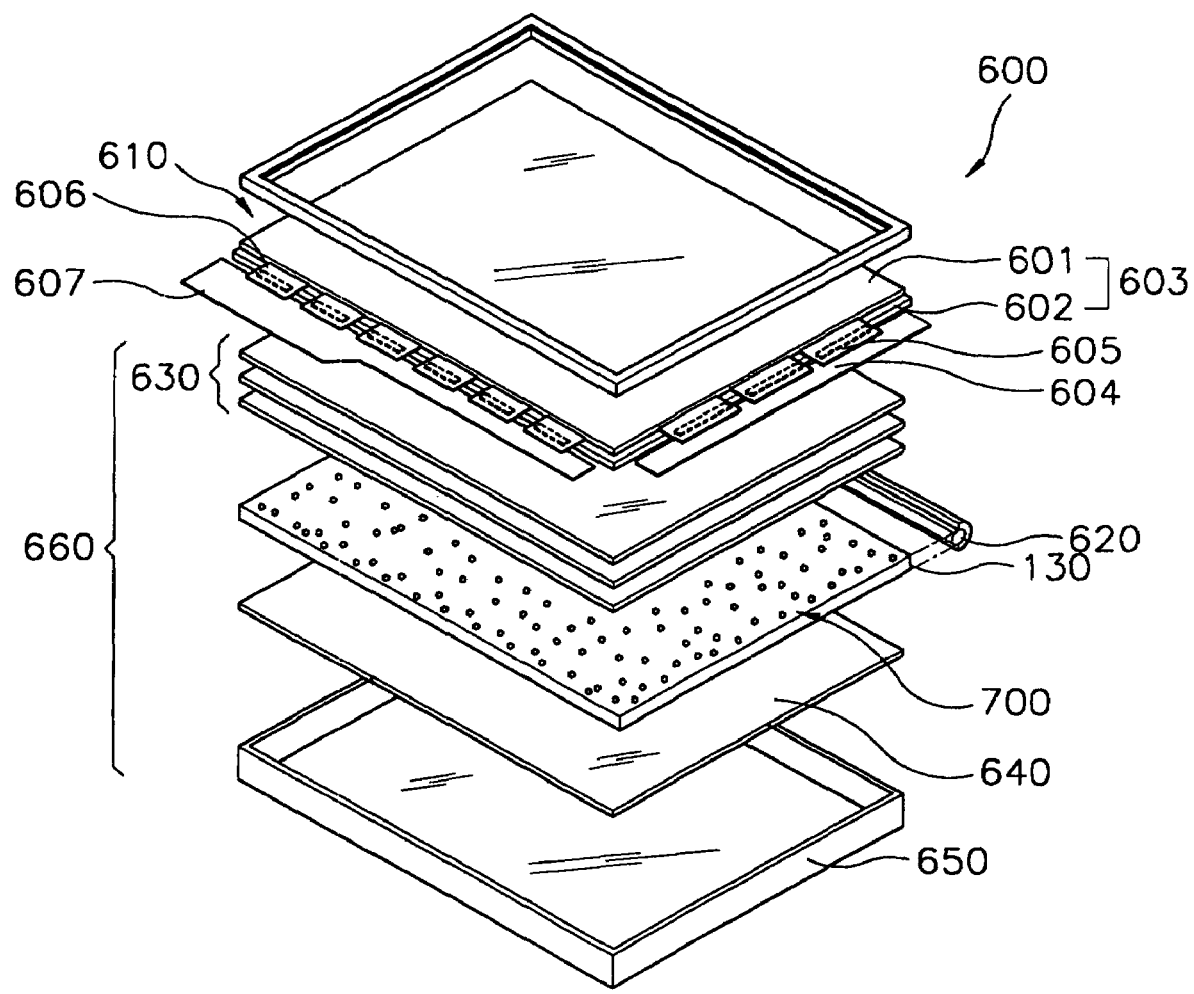
FIG. 12 is an exploded perspective view of an LCD to which the light guiding plate in accordance with the first embodiment of the present invention is applied.

FIG. 12 is an exploded perspective view of an LCD to which the light guiding plate 700 having the aforementioned constitution is applied.

The LCD 600 includes an LCD panel assembly 610 and a backlight assembly 660.

More particularly, the LCD panel assembly 610 includes: an LCD panel 603 provided with a thin film transistor (TFT) substrate 601, a color filter substrate 602 and a liquid crystal layer between the TFT substrate 601 and the color filter substrate 602; and a driving module 604, 605, 606, 607 for driving the LCD panel 603.

In the meanwhile, the liquid crystal layer in the LCD panel assembly 610 functions to vary only the transmittance by an electric field as applied. Such a fact means that a light source having a high and uniform brightness should be provided in order to perform a display operation in the LCD panel assembly 610.

So as to satisfy this request, the backlight assembly 660 is established below the LCD panel 603.

The backlight assembly 660 in accordance with one embodiment of the present invention includes the light guiding plate 700 having the aforementioned brightness enhancement recess 112, a lamp assembly 620 for providing the light incident face 130 of the light guiding plate 700 with a light, an optical sheet 630 disposed on the light output face 120 (not shown) of the light guiding plate 700, for enhancing the uniformity in the light passing through the light guiding plate 700, and a reflection plate 640 disposed below the light guiding plate 700, for reflecting a leakage light leaked through the light guiding plate 700.

In FIG. 12, an unexplained reference numeral 650 is a receiving container.

Table 1 shows difference between a constitution of a conventional backlight assembly and that of the backlight assembly provided in the first embodiment of the present invention.

TABLE 1

| Conventional Art | Items | 1$^{St}$ Embodiment |
| --- | --- | --- |
| Establish | Prism sheet | Establish |
| Establish | Diffusion sheet | Establish |
| Establish (Use of Reflection dots) | Light guiding plate | Establish (Use of brightness enhancement recess) |
| Establish Reference Datum value | Reflection plate Brightness | Establish 10% enhancement compared with reference datum value |

Referring to Table 1, both the conventional backlight assembly and the backlight assembly 660 of the present invention include the optical sheet comprised of the prism sheet and the diffusion plate, the light guiding plate and the reflection plate. However, it can be noted that the light guiding plate 700 used in the backlight assembly 660 of the present invention has the brightness enhancement recess 112 unlike the light guiding plate of the conventional art and thereby the brightness is enhanced by about 10% or more compared with the conventional backlight assembly.

Meanwhile, in the case that the structure of the brightness enhancement recess 112 formed in a matrix shape in the light guiding plate 700 is again modified, it can be prevented that an image displayed on the panel is viewed brighter or darker locally, and thus the displaying performance is lowered.

Figure 13:
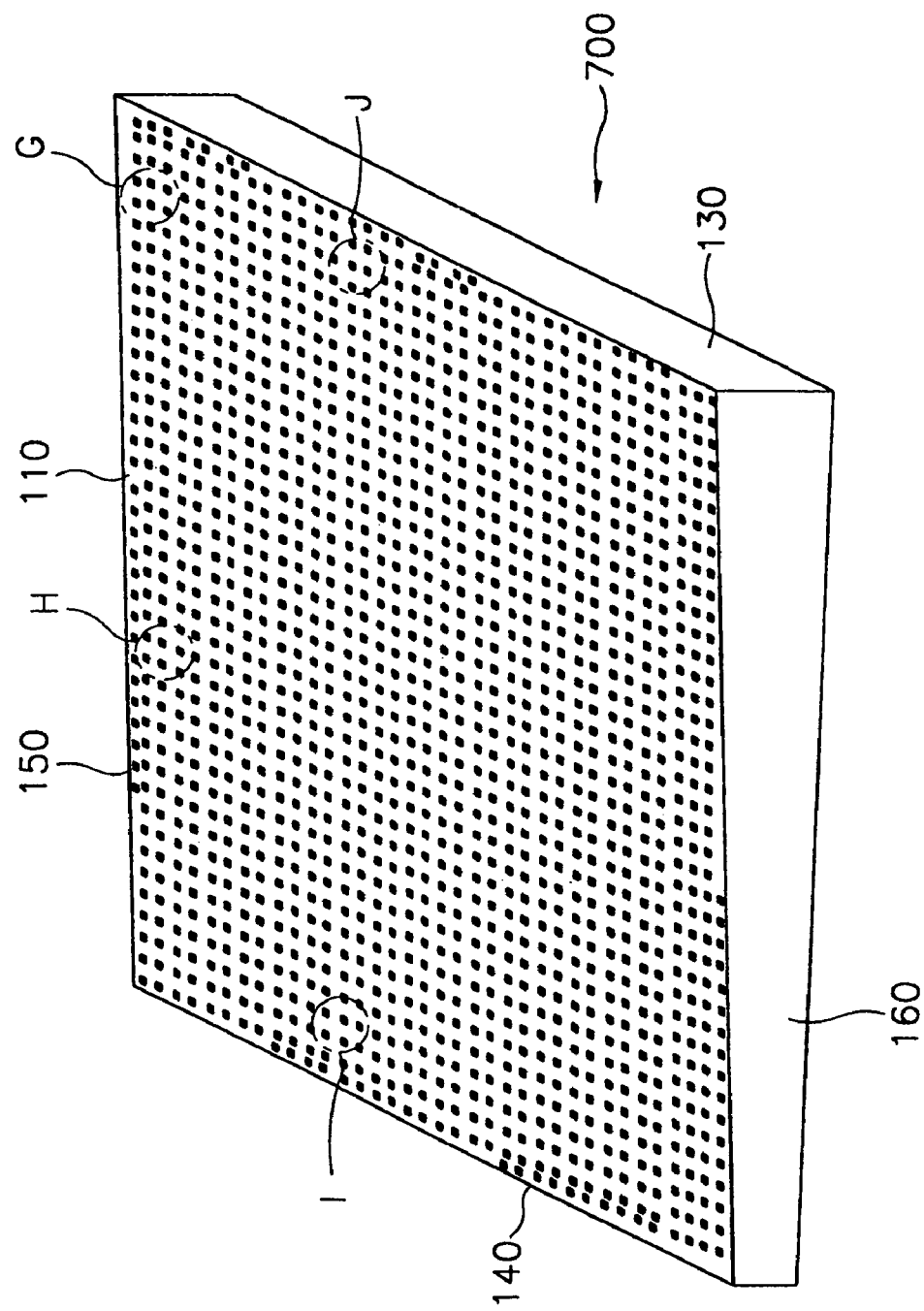
FIG. 13 a rear perspective view of a light guiding plate with a curved brightness enhancement recess in accordance with the second embodiment of the present invention.
Figure 14:
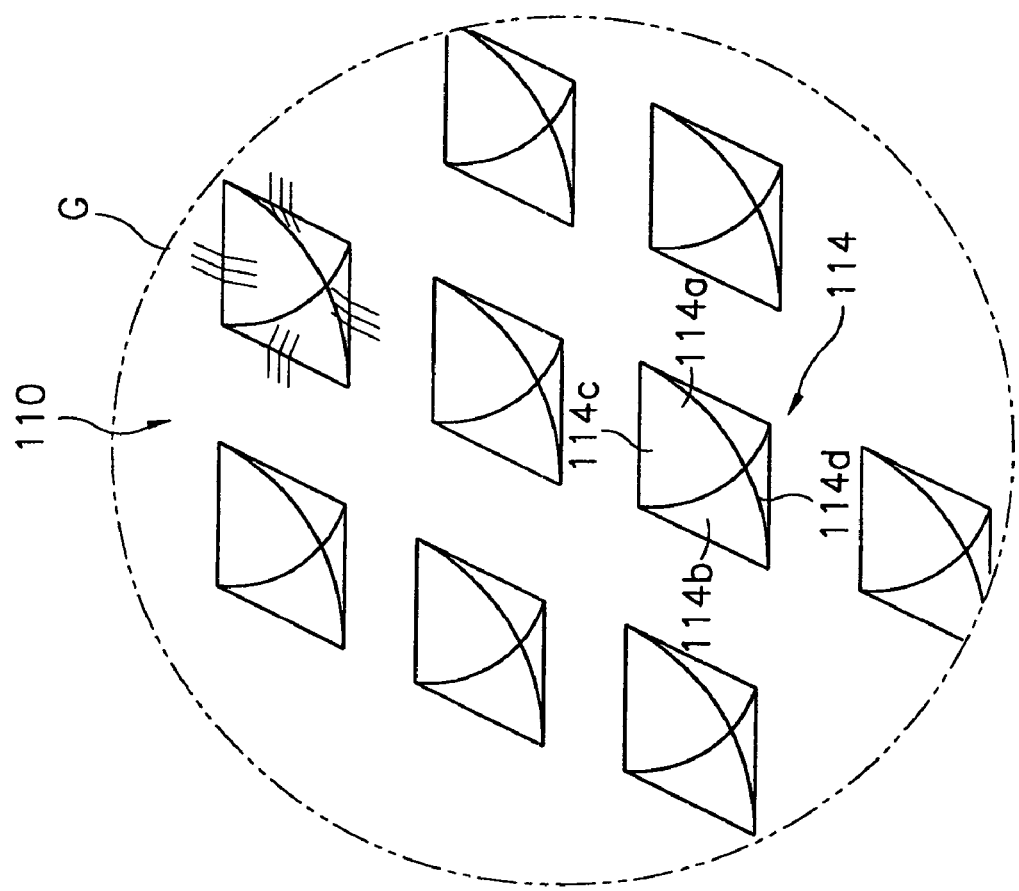
FIG. 14 is an enlarged view of the portion "G" in FIG. 13.

Shown in FIG. 13 is a rear perspective view of a light guiding plate 700 including a curved brightness enhancement recess 114 (not shown) in accordance with the second embodiment of the present invention. In order to prevent the lowering in the displaying performance due to occurrence of these local defects, the first to the fourth side face 114a to 14d of the light guiding plate 700 may be formed with a curvature in which the side faces are curved outwardly from the inner space of the brightness enhancement recess 112, as shown in FIG. 14, which is an enlarged view of the portion "G" of FIG. 13.

Figure 15:
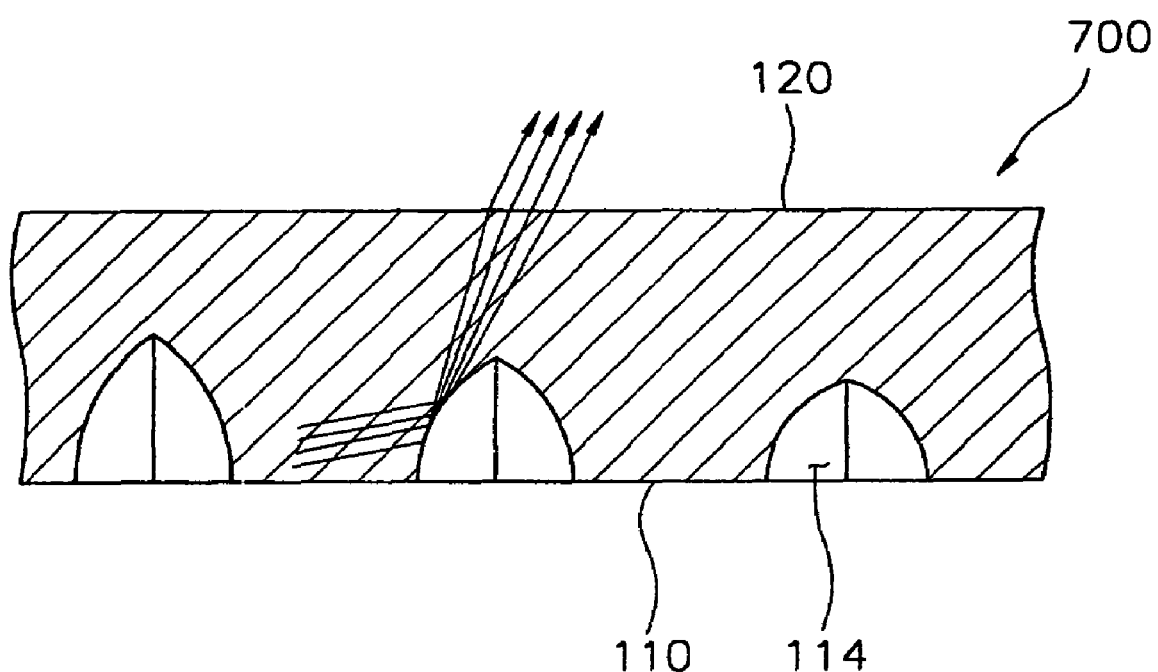
FIG. 15 is a cross-sectional view of the curved brightness enhancement recess in the light guiding plate of FIG. 13.

The curved side faces 114a to 114d of the brightness enhancement recess 114 allow an incident light to be reflected by the curved side faces 114a to 114d with a wider angle, so that the light diffusion is performed with the variety of the reflection paths as shown in the cross-sectional view of FIG. 15.

Thus, in the case that the light is diffused through the curved side faces 114a to 114d of the brightness enhancement recess 114, an image can be displayed with a high brightness and an enhanced light uniformity, so that a high quality image may be displayed.

The above light guiding plate 700 with the brightness enhancement recess 114 having the curved side faces 114a to 114d may be manufactured by the same method as shown in FIGS. 11A to FIG. 11 G except for the side face portions.

In order to form the side face portions 114a to 114d of the brightness enhancement recess 114 to have such the curvature, the wavelength of light used for the exposure of the photoresist film is precisely controlled.

Figure 16:
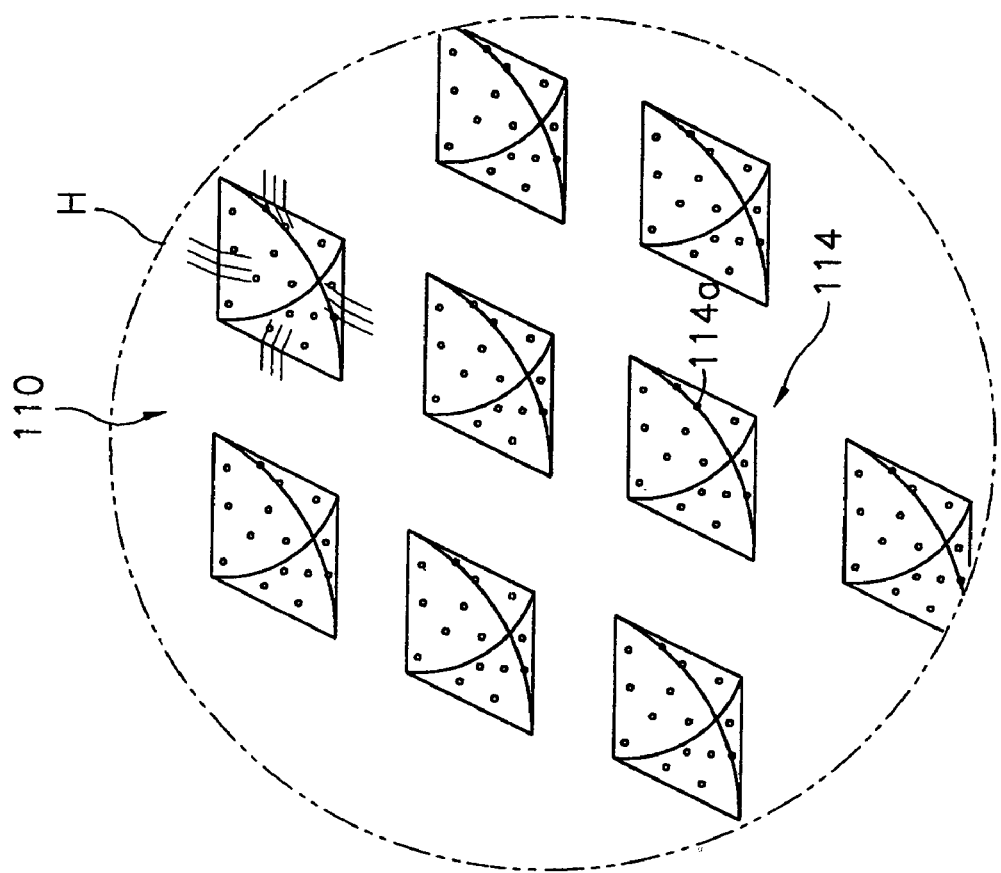
FIG. 16 is an enlarged view of the portion "H" in FIG. 13 in which a light diffusion recess is further formed in the curved brightness enhancement recess in accordance with another embodiment of the present invention.

Meanwhile, so as to reinforce the diffusion ability in the brightness enhancement recess formed in the light guiding plate 700, a plurality of light diffusion recesses 114e are formed in the side faces 114a to 114d of the brightness enhancement recess 114 as to shown in FIG. 16 which is an enlarged view of the portion "H" from FIG.13.

Figure 17:
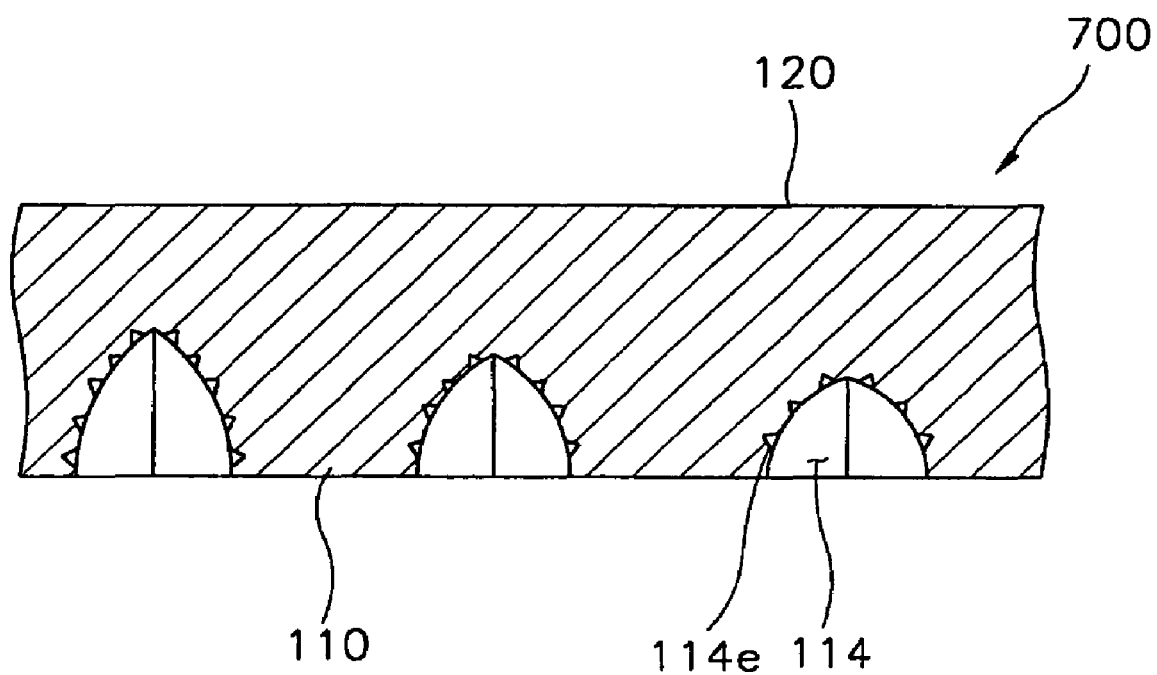
FIG. 17 is a cross-sectional view of the curved brightness enhancement recess in the light guiding plate with the light diffusion recess of FIG. 16.

Specifically, referring to FIG. 17, when it is assumed that the brightness enhancement recess is 100 µm wide by 100 µm long, at least one light diffusion recess 114e is formed with a width and a length, ranged from 15 µm to 20 µm at the side faces 114a to 114d of the brightness enhancement recess 114.

These light diffusion recesses 114e scatter the light diffusion reflected by the brightness enhancement recess 114 to further enhance the brightness uniformity.

Here, the light diffusion recess 114e is formed to have a regular shape or an irregular shape. Also, a plurality of the light diffusion recesses 114e are formed to have a regular arrangement or an irregular arrangement.

Next, there is described a method for manufacturing the light guiding plate having the brightness enhancement recess 114 in which the light diffusion recess 114e is formed with reference to the accompanying drawings of FIG. 18A to FIG. 18G.

Figure 18A:
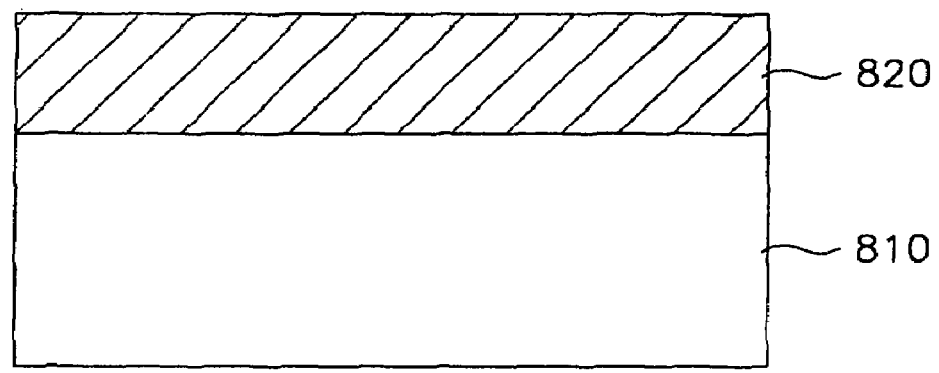
FIGS. 18A through 18G are views for illustrating a method for forming the curved brightness enhancement recess with the light diffusion recess.

First, as shown in FIG. 18A, there is formed a thick photoresist film 820 on a base substrate 810 by a spin coating method.

Figure 18B:
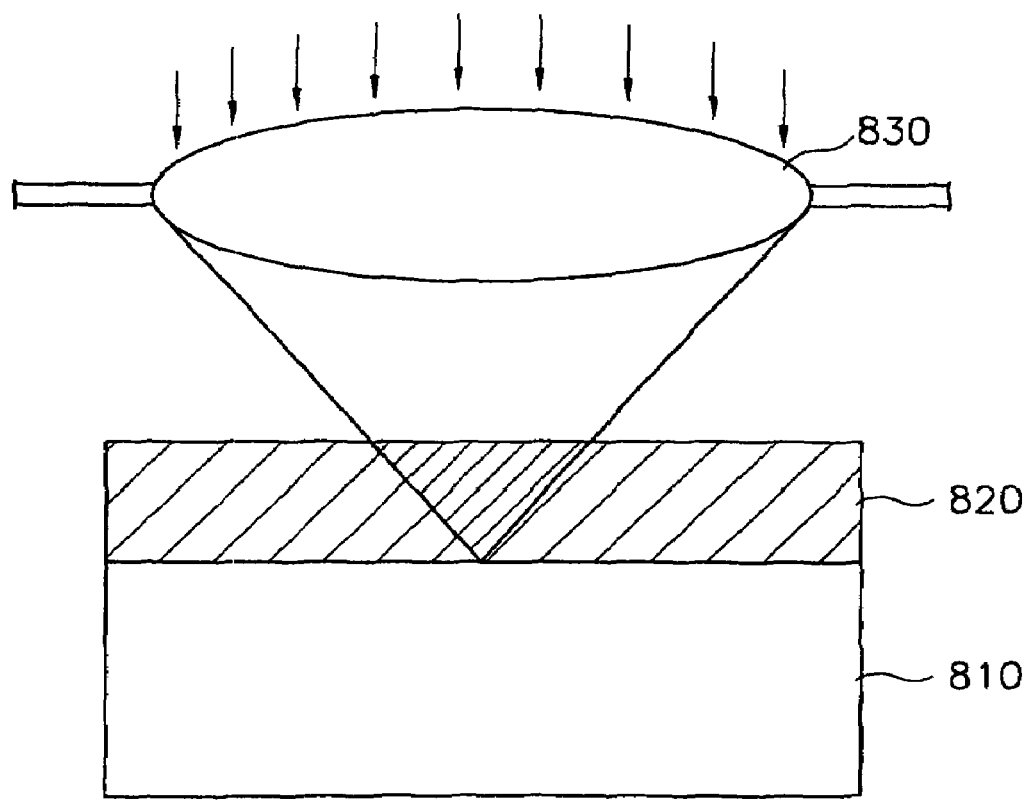

After that, as shown in FIG. 18B, a micro lens 830 for concentrating an incident light is aligned over the photoresist film 820.

Thereafter, the light generated from a light source is emitted onto the micro lens 830 to pass through the micro lens 830. Then, the light passing through the micro lens 830 is irradiated onto the photoresist film 820 to expose the photoresist film 820 to the light.

The light passing through the micro lens 830 has a quadrangular pyramidal shape whose area decreases gradually as it goes from the micro lens 830 to a focused portion of the photoresist film 820. Thus, the photoresist film 820 is exposed to have the same profile as the light irradiated onto the micro lens 830.

Figure 18C:
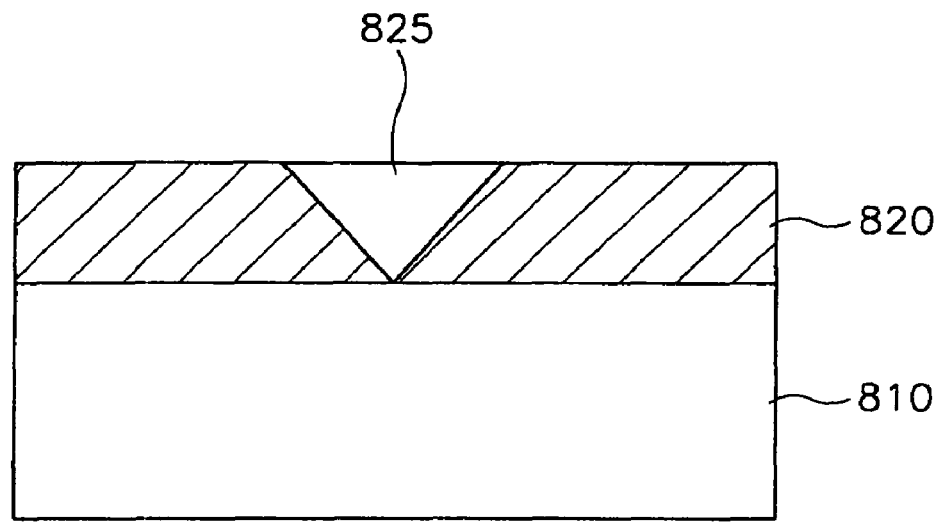
Figure 18D:
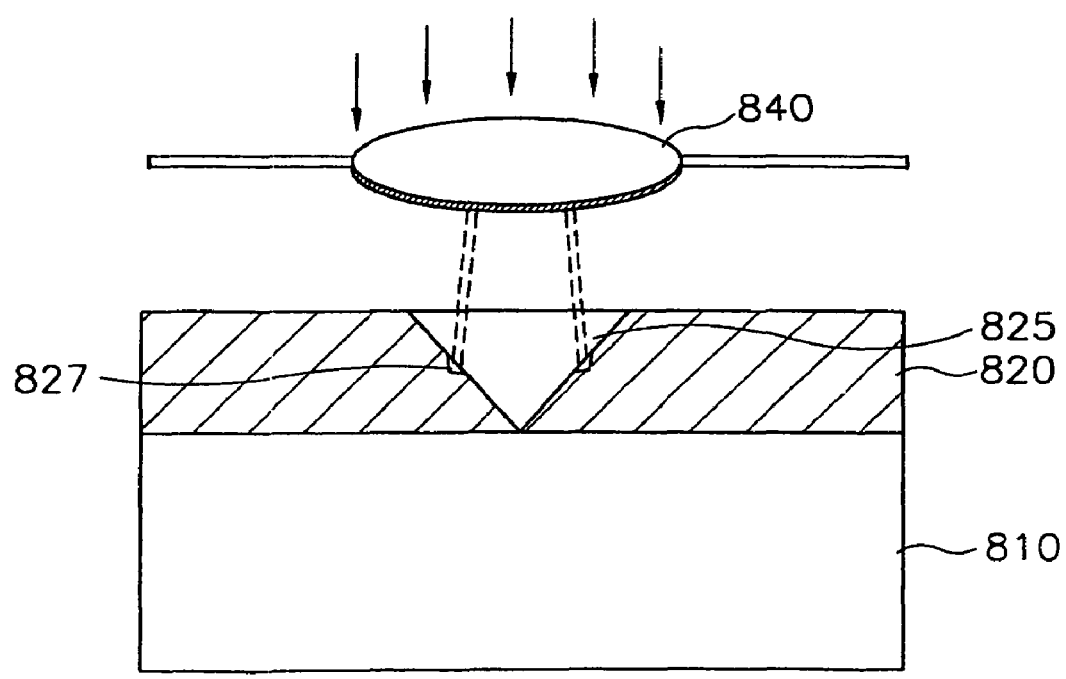
Figure 18E:
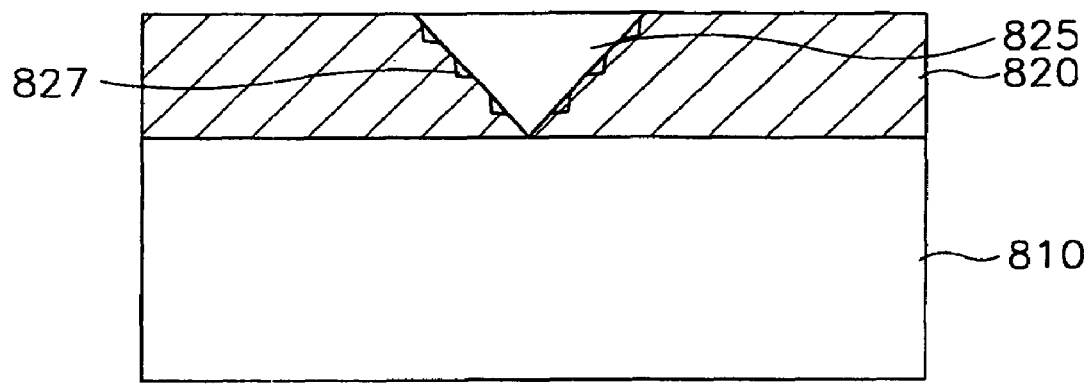

Subsequently, as shown in FIG. 18C, the exposed photoresist film 820 is developed and thus a recess 825 having a polygonal cone shape, preferably a quadrangular pyramidal shape is formed Thereafter as shown in FIG. 18D, another micro lens 840 for forming the light diffusion recess 114e is aligned over the photoresist film 820 such that it corresponds to the recess 825. The micro lens 840 includes a light shielding film formed throughout the entire area of one surface of the micro lens 840 and a plurality of openings formed in the light shielding film and having a dot shape in order to form the plurality of light diffusion recess in the side faces of the recess 825. The light is again irradiated onto the side face of the recess 825 through the micro lens 840 to expose selected portions of the recess 825 of the photoresist film 820. Then, the exposed portions are developed. As a result, another recess 827 for the formation of the light diffusion recess 114e is formed in the recess 825 as shown in FIG. 18E.

Figure 18F:
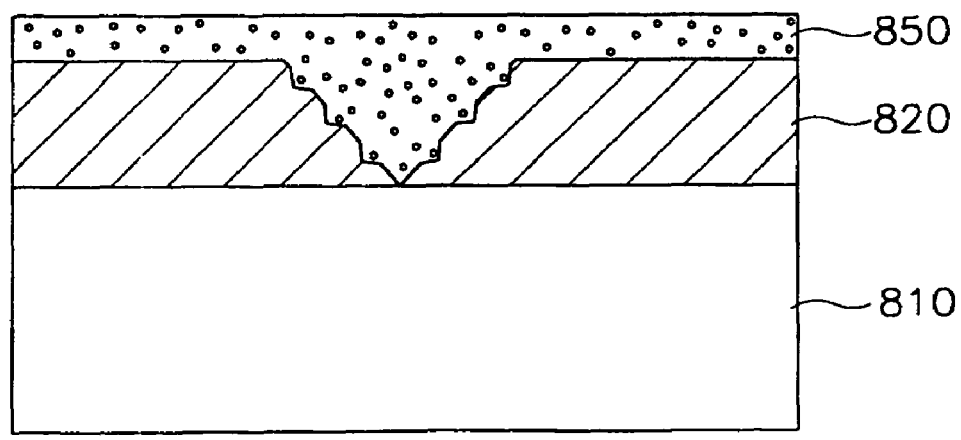

Afterwards, as shown in FIG. 18F, a metal layer 850 is deposited on the patterned photoresist film including the recess 825 and 827 (not shown) to a predetermined thickness by a sputtering method. The deposited metal layer 850 serves as a metal substrate having protrusions corresponding to the recess 825 and 827.

Figure 18G:
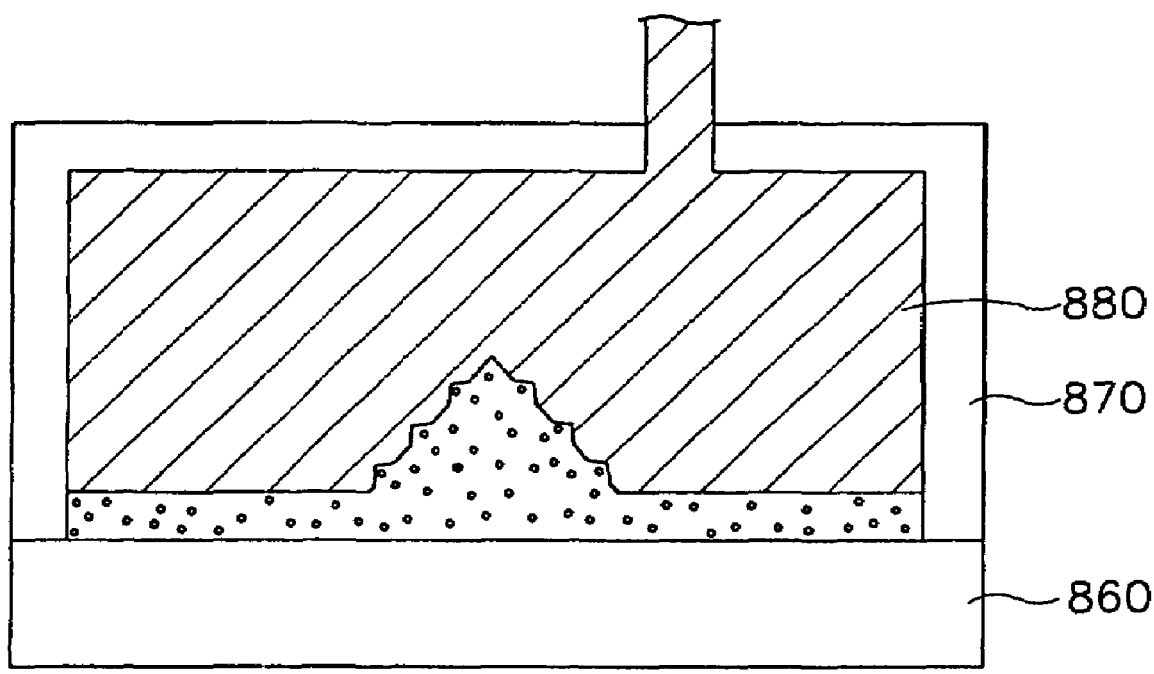

Thereafter, as shown in FIG. 18G, the patterned photoresist film 820 attached to the metal layer 850 is removed by an ashing process. Then, the metal substrate 850 is attached onto a lower mold 860 by turning upside down the metal layer 850 of FIG. 18f for the formation of the light guiding plate.

Afterwards, an upper mold 870 for the formation of the light guiding plate is coupled to the lower mold 860. Then, a liquid material 880 for the formation of the light guiding plate is injected into a space between the lower mold 860 and the upper mold 870 through an injection hole of the upper mold 870. Resultantly, the brightness enhancement recess 114 and the light diffusion recess 114e are both formed in the light reflection face 110 of the light guiding plate 700.

Figure 19:
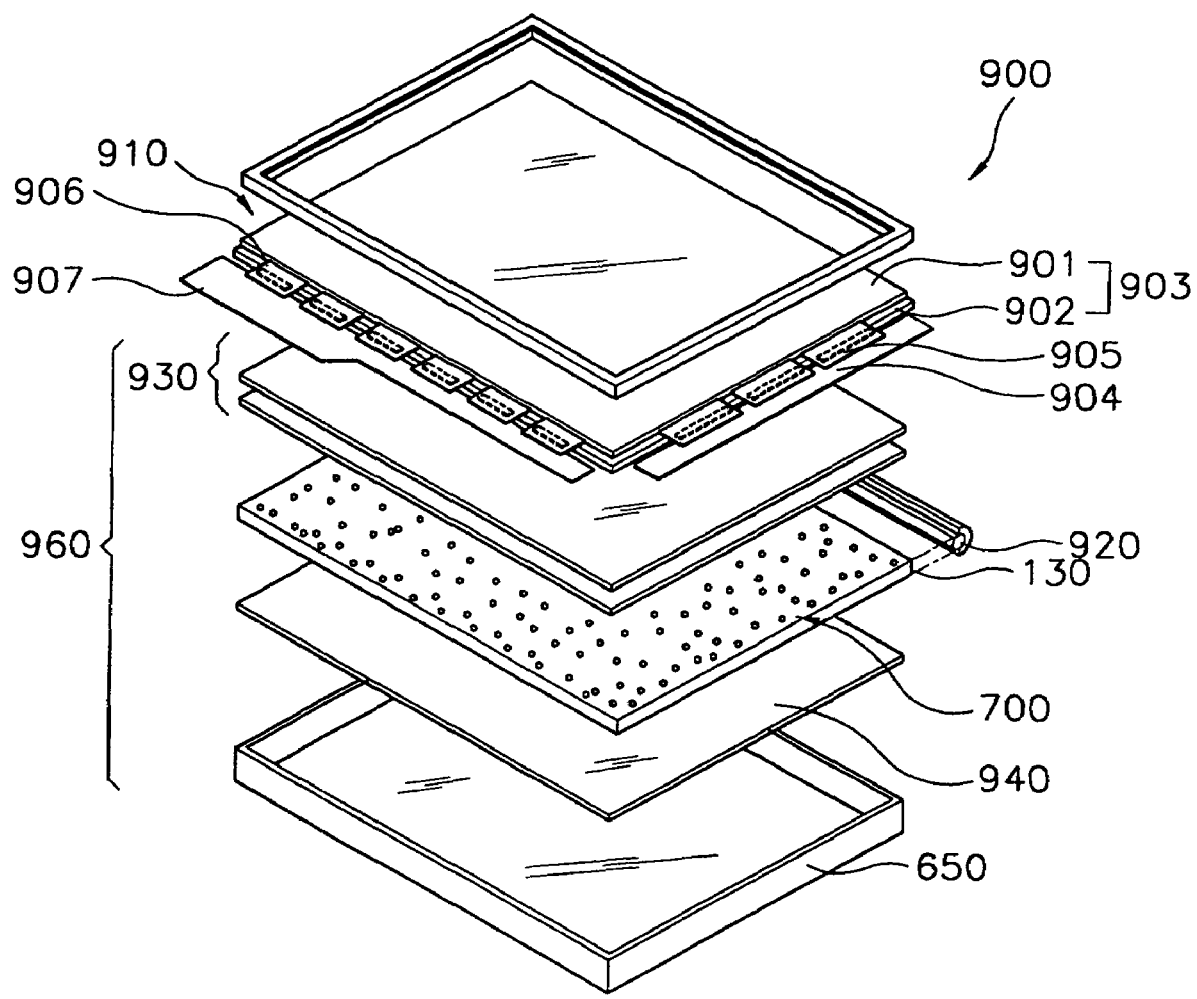
FIG. 19 is an exploded perspective view of an LCD to which the light guiding plate is applied in accordance with the second embodiment of the present invention.

FIG. 19 is an exploded perspective view of an LCD 900 to which the light guiding plate 700 having the aforementioned brightness enhancement recess 114 and light diffusion recess 114e are applied.

The LCD 900 includes an LCD panel assembly 910 and a backlight assembly 960.

More specifically, the LCD panel assembly 910 includes: an LCD panel 903 provided with a TFT substrate 901, a color filter substrate 902 and a liquid crystal layer interposed between the TFT substrate 901 and the color filter substrate 902; and a driving module 904, 905, 906, 907 for driving the LCD panel 903.

Meanwhile, the liquid crystal layer in the LCD panel assembly 910 functions to vary only the transmittance by an electric field as applied. Such a fact means that a light source should be provided in order to perform a display operation in the LCD panel assembly 910.

So as to satisfy this requirement, the backlight assembly 960 is established below the LCD panel 903.

The backlight assembly 960 in accordance with one embodiment of the present invention includes the light guiding plate 700 having the brightness enhancement recess 112 provided with the brightness enhancement recess 114 and the light diffusion recess 114e, a lamp assembly 920 for providing the light incident face 130 of the light guiding plate 700 with a light, at least one prism sheet 930 disposed on the light guiding plate 700, for enhancing the visual angle, and a reflection plate 940 disposed below the light guiding plate 700, for reflecting a leakage light leaked through the light guiding plate 700.

In FIG. 19, unexplained reference numeral 650 indicates a receiving container.

Here, what is important is that the LCD 900 to which the light guiding plate 700 is applied is not affected on the deletion of the diffusion sheet between the upper surface of the light guiding plate 700 and the LCD panel assembly 910. This is because the curved side faces 114a to 114d of the brightness enhancement recess 114 formed in the light reflection face 110 of the light guiding plate 700, or the light diffusion recess 114e formed at the side faces 114a to 114d of the brightness enhancement recess 114, performs the light diffusion function of the diffusion sheet.

Table 2 shows differences between a constitution of a conventional backlight assembly and that of the backlight assembly of an embodiment of the present invention provided with the light guiding plate having both the curved side faces 114a to 114d and the light diffusion recess 114e.

TABLE 2

| Conventional Art | Items | 1st Embodiment |
| --- | --- | --- |
| Establish | Prism sheet | Establish |
| Establish | Diffusion plate | Not established |
| Establish (Use of Reflection dots) | Light guiding plate | Establish (Use of curved brightness enhancement recess and light diffusion recess) |
| Establish Reference datum value | Reflection plate Brightness | Establish 10% enhancement compared with reference datum value |

According to Table 2, both the conventional backlight assembly and the backlight assembly 660 of the present invention include the prism sheet 930, the light guiding plate 700 and the reflection plate 940, except for the diffusion plate. However, in the backlight assembly of the present invention, since the light diffusion is sufficiently performed by the brightness enhancement recess 114 and by the light diffusion recess 114e through the light guiding plate 700, the display performance is not affected by the non-existence of the diffusion plate. Also, the brightness is enhanced by about 10% or more compared with the conventional backlight assembly.

Embodiment 2

The light guiding plate 700 described in the first embodiment functions to enhance the uniformity and brightness of the light input into the light guiding plate 700 by forming the brightness enhancement recess 114 and/or the light diffusion recess 114e.

However, the second embodiment modifies the structure of the light output face 120 of the light guiding plate 700 such that it secures a front visual angle of the light with an enhanced uniformity due to the brightness enhancement recess 114.

Figure 20:
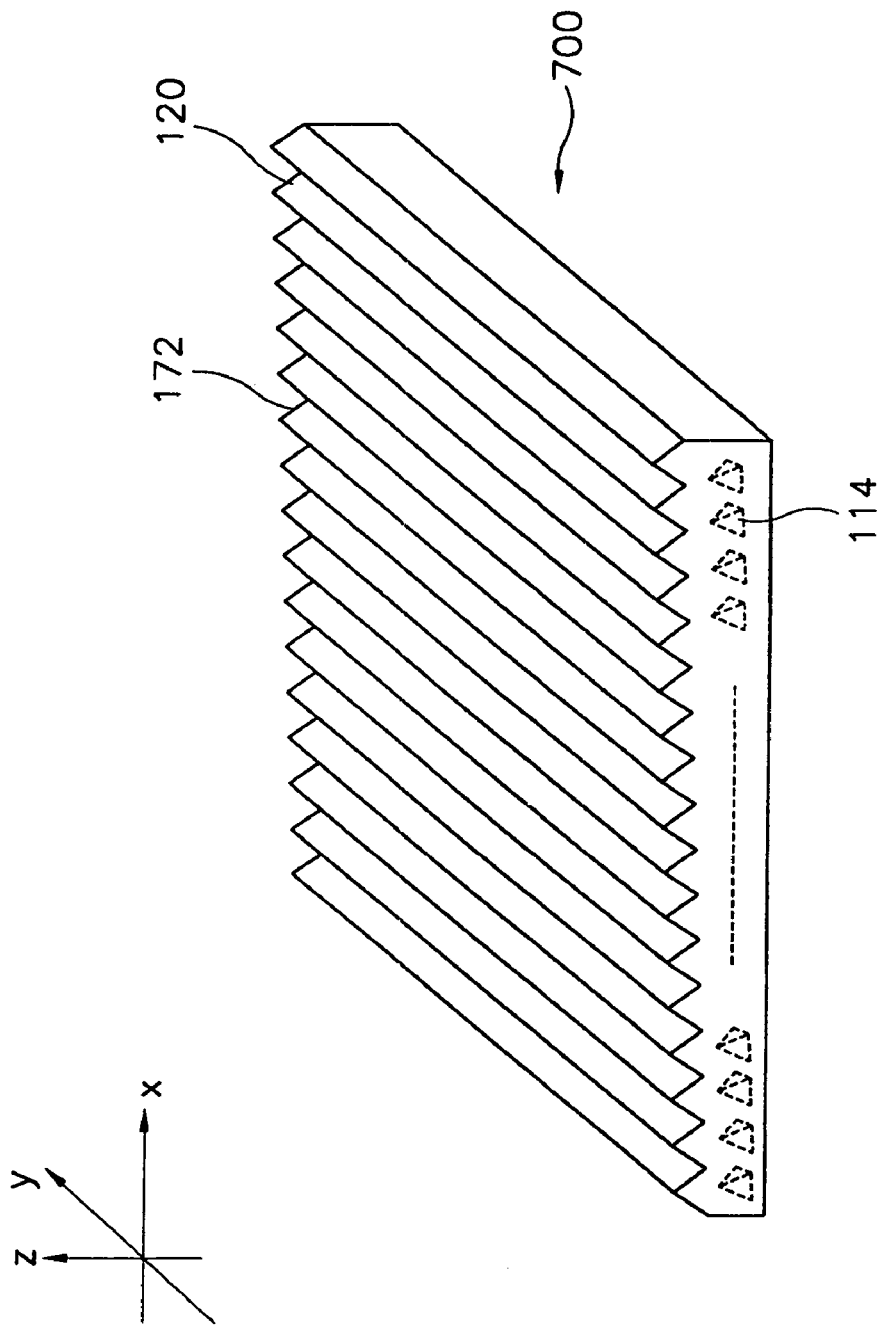
FIG. 20 is a perspective view of the light guiding plate in accordance with another embodiment of the present invention.

Specifically, as shown in FIG. 20, a light concentration pattern 172 is formed at the light output face 120 of the light guiding plate 700. The light concentration pattern 172 is in parallel with the y-axis direction of an x-y-z coordinate as shown. There is at least one light concentration pattern 172, and it may be repeated in succession. The light concentration pattern 172 has a structure in which a plurality of prisms are arranged parallel to each other.

The light concentration pattern 172 functions to vary the progressive direction of the light, which is incident into the light output face 120 and does not have a constant directionality, toward a direction in which the visual angle is improved. At this time, the pitches in the light concentration pattern 172 and the pixel patterns of the LCD panel are precisely controlled such that a condition generating Moire phenomenon is not satisfied.

Hereinafter, there is described a method for forming the light guiding plate 700 having the light concentration pattern 172 formed in the light reflection face 120 and the brightness enhancement recess 114 formed in the light reflection face 110 with reference to the accompanying drawings of FIG. 21A to FIG. 21G.

Figure 21A:
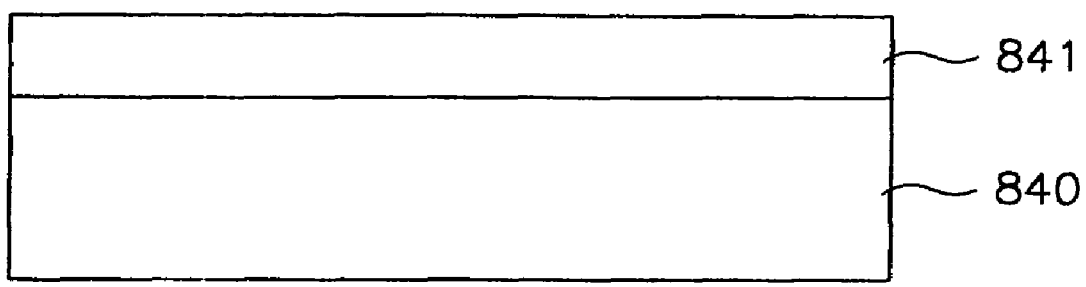
FIGS. 21A through 21F are views illustrating a method for manufacturing the light guiding plate of FIG. 20.
Figure 21B:
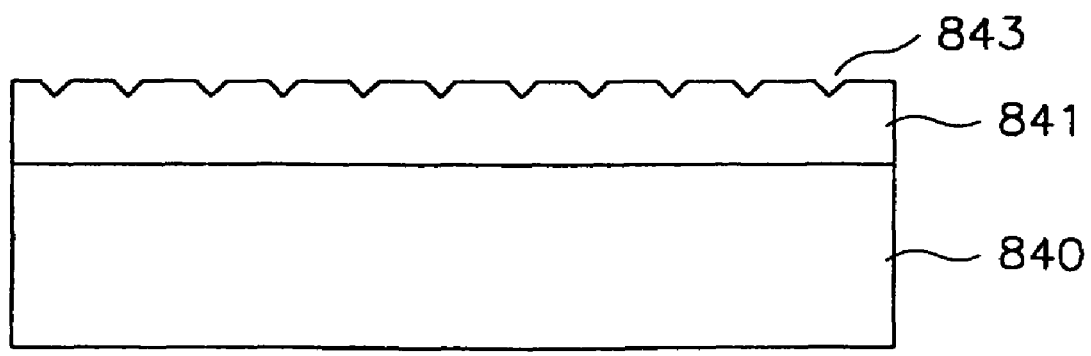

First, as shown in FIG. 21A, a thick photoresist film 841 is formed on a base substrate 840 having a plate shape by a spin coating method.

After that, as shown in FIG. 21 B, a micro lens (not shown) is aligned over the photoresist film 841 and the photoresist film 841 is exposed to the light generated from a light source and passing through the micro lens, so that one or more recesses 843, having a shape corresponding to the brightness enhancement recesses 114, are formed on a top of the photoresist film 841.

Figure 21C:
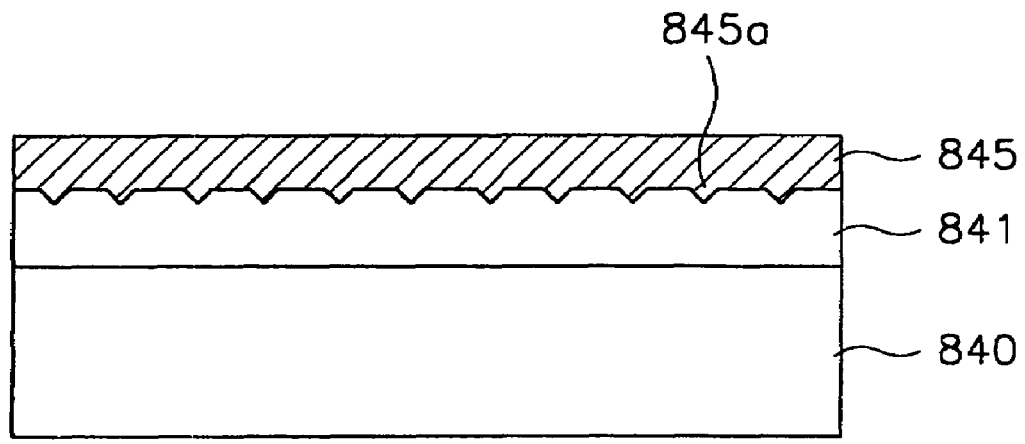

Afterwards, as shown in FIG. 21C, a dense metal film 845 is formed on the photoresist film 841 including the recess 843 to a certain thickness by a sputtering method. The deposited metal layer 845 serves as a metal substrate having a metal protrusion pattern 845a corresponding to the brightness enhancement recess 114.

Figure 21D:
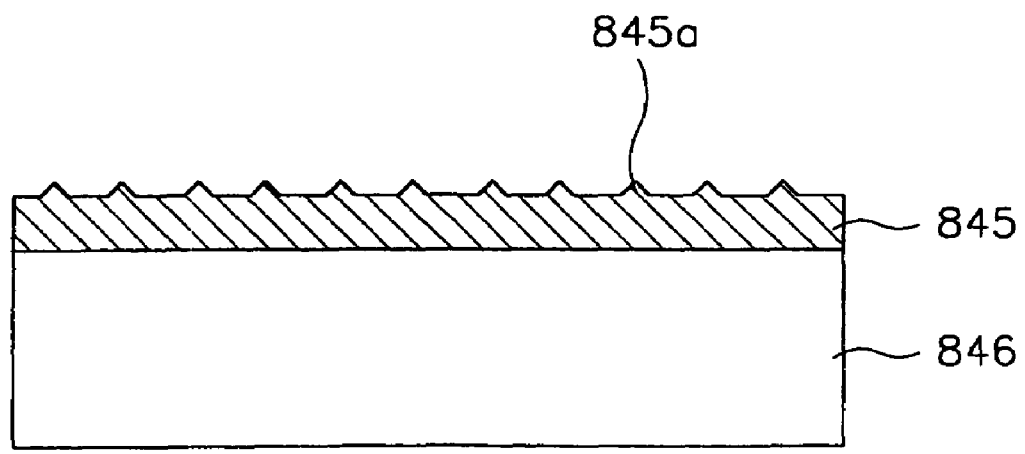
Figure 21E:
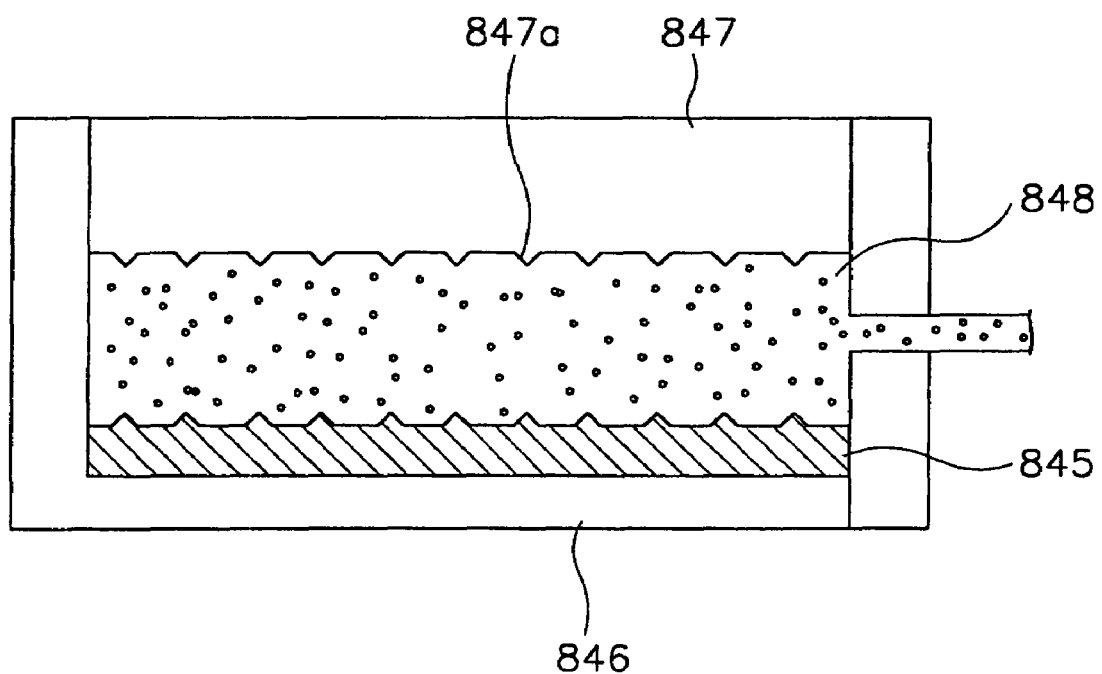
Figure 21F:
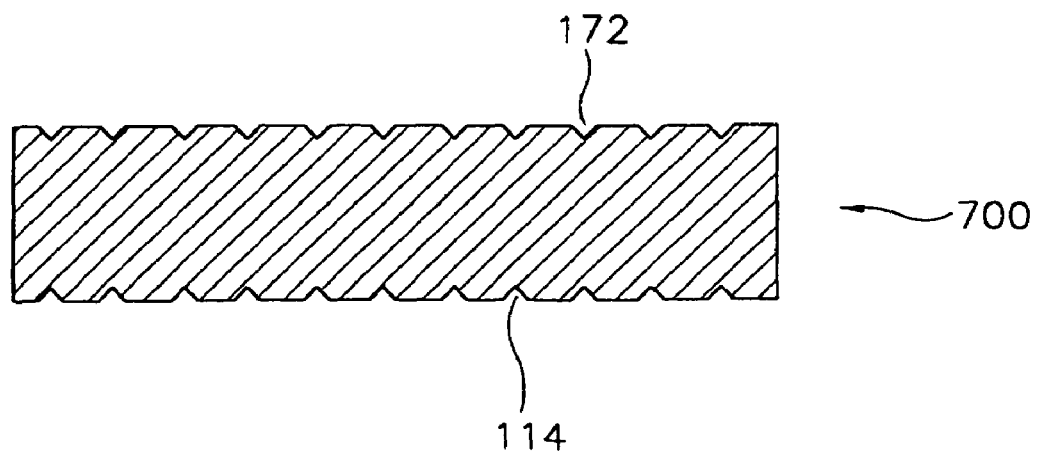

Thereafter, as shown in FIG. 21D, the metal substrate 845 attached on the patterned photoresist film 841 is separated from the photoresist film 841 and is fixed on a selected position of a lower mold 846 such that the metal protrusion pattern 845a is directed upwards.

Afterwards, as shown in FIG. 21 E, an upper mold 847 for the formation of the light guiding plate is coupled to the lower mold 846. Then, a liquid material 848 for the formation of the light guiding plate 700 is injected into a space between the lower mold 846 and the upper mold 847 through an injection hole of the upper mold 847, as shown in FIG. 21E. Resultantly, the manufactured light guiding plate 700 has a V-shaped light concentration pattern 172 formed in the light output face 120 and the brightness enhancement recess 114 formed in the light reflection face, as shown in FIG. 21 F.

Then, since the light concentration pattern 172 of the manufactured light guiding plate 700 is in parallel with the y-axis direction, a light having a path parallel to the z-y plane of the x-y-z coordinate shown in FIG. 20 changes its progressive path into a direction for improving the visual angle.

However, it is noted that it is very difficult to change the progressive path of the light parallel to the z-y plane.

To this end, there is provided an embodiment for improving the visual angle of the light having a progressive path parallel to the z-y plane.

Figure 22:
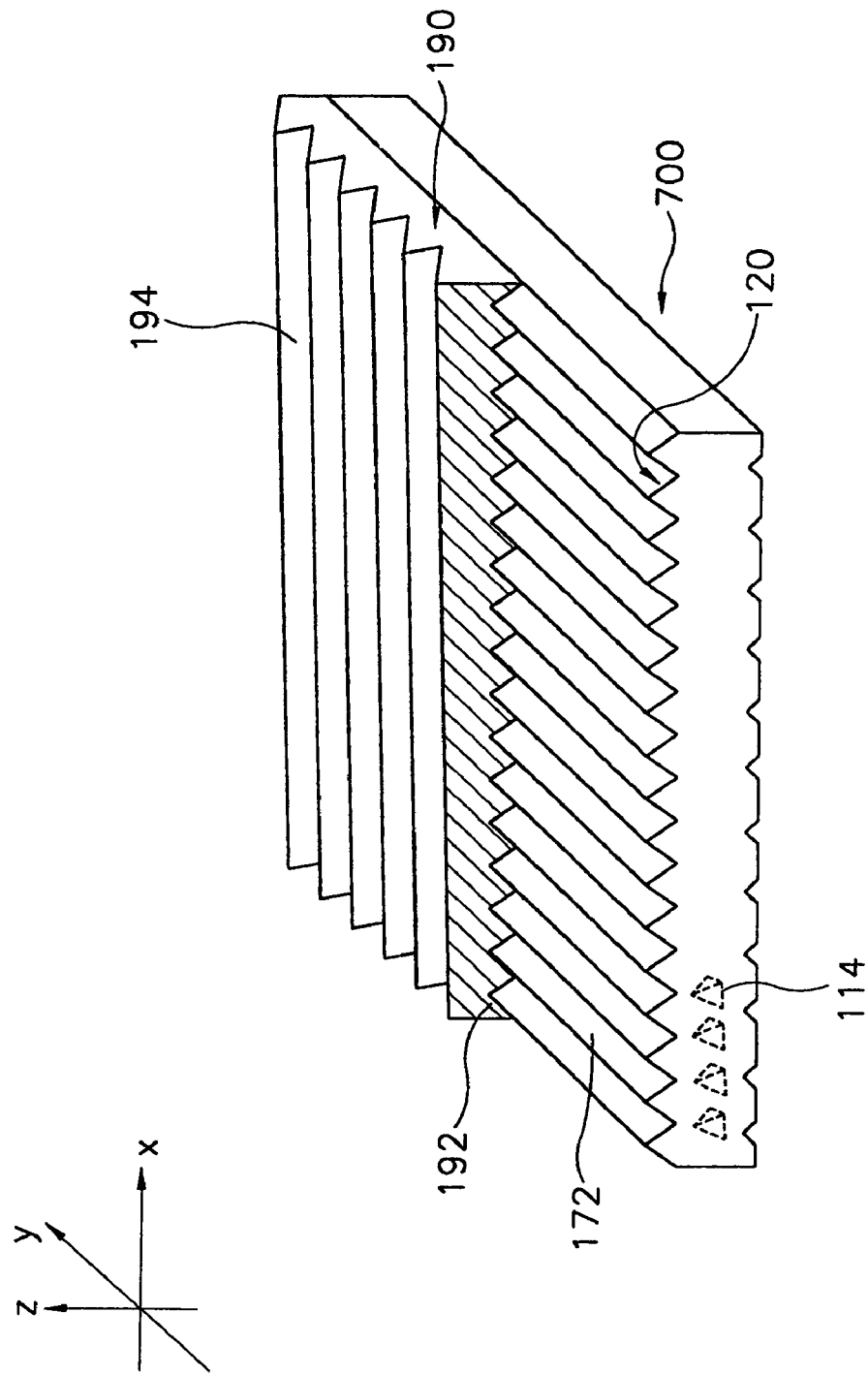
FIG. 22 is a perspective view of the light guiding plate in accordance with 15 another embodiment of the present invention.

FIG. 22 is a perspective view of a light guiding plate 700 in accordance with another embodiment of the present invention.

Referring to FIG. 22, a light concentration pattern 172 is formed at the light output face 120 of the light guiding plate 700. The light concentration pattern 172 is in parallel with the y-axis direction, is repeated along the x-axis direction and has a profile of a prism shape.

Further, a brightness concentration light guiding plate 190 may be formed on the light concentration pattern 172 of the light guiding plate 700. The brightness concentration light guiding plate 190 has a bottom face with a first auxiliary light concentration pattern 192 engaged with the light concentration pattern 172 and an upper face with a second auxiliary light concentration pattern 194 which is in parallel with the x-axis direction, is repeated along the y-axis direction and has a V-shaped prism profile.

The brightness concentration light guiding plate 190 and the light guiding plate 700 can be manufactured in an integrated structure by a mold or they can be manufactured independently and then be coupled to each other.

When the light concentration pattern 172 of the light guiding plate 700 is engaged with the first auxiliary light concentration pattern 192 of the brightness concentration light guiding plate 190, a fine space is allowed therebetween, which optimizes the refractivity of the light.

Unlike the above, while the brightness concentration light guiding plate 190 is manufactured as one body with the light guiding plate 700, the light guiding plate 700 can be made of a different material from the brightness concentration light guiding plate 190. At this time, an optical refractivity between the light passing through the light guiding plate 700 and the light passing through the brightness concentration light guiding plate 190 should be considered.

Alternatively, while the brightness concentration light guiding plate 190 is manufactured as one body with the light guiding plate 700, the light guiding plate 700 can be made of the same material as the brightness concentration light guiding plate 190.

Hereinafter, there is described a method for manufacturing the brightness concentration light guiding plate 190 as one body with the light guiding plate 700 with reference to the accompanying drawings of FIG. 21A to FIG. 21F, FIG. 23A and FIG. 23B.

First, the processes are performed in the same manner as described in FIG. 21A through FIG. 21 F to manufacture a light guiding plate 700 having a light output face 120 with the light concentration pattern 172 and a light reflection face with the brightness enhancement recess 114.

Figure 23A:
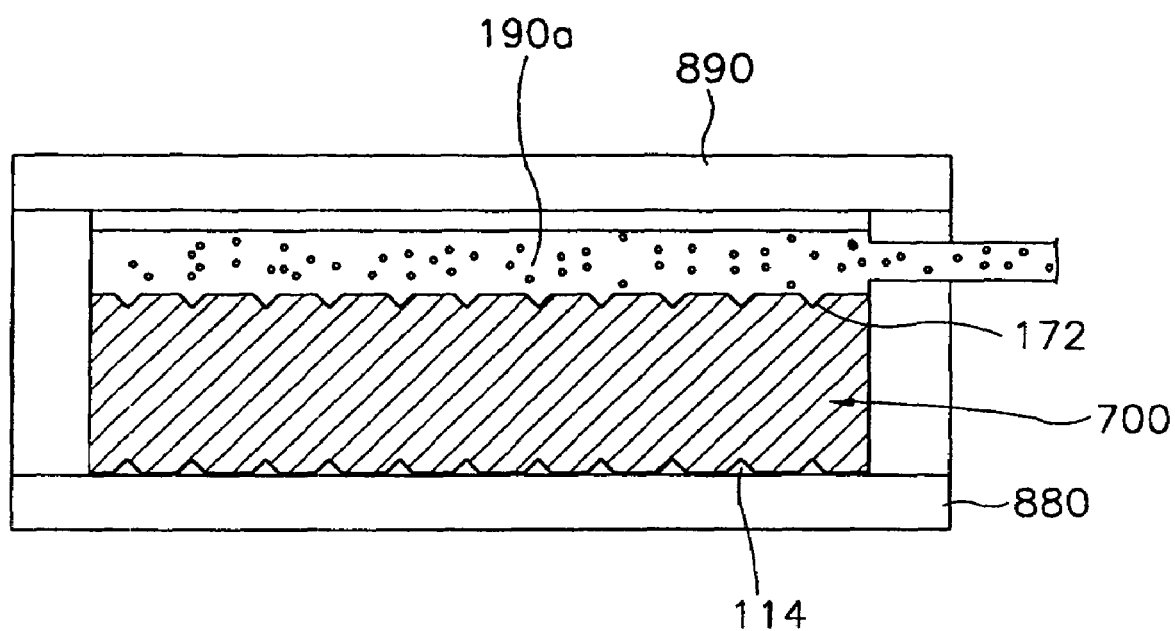
FIGS. 23A and 23B are views describing a method for manufacturing the light guiding plate of FIG. 22.

After that, as shown in FIG. 23A, the manufactured light guiding plate 700 is fixed on a lower mold 880 and then an upper mold 890 is coupled to the lower mold 880.

At this time, an additional plate having a direction different from that of the light concentration pattern 172, preferably perpendicular to the light concentration pattern 172, and having a prism shape is established below the upper mold 890.

Figure 23B:
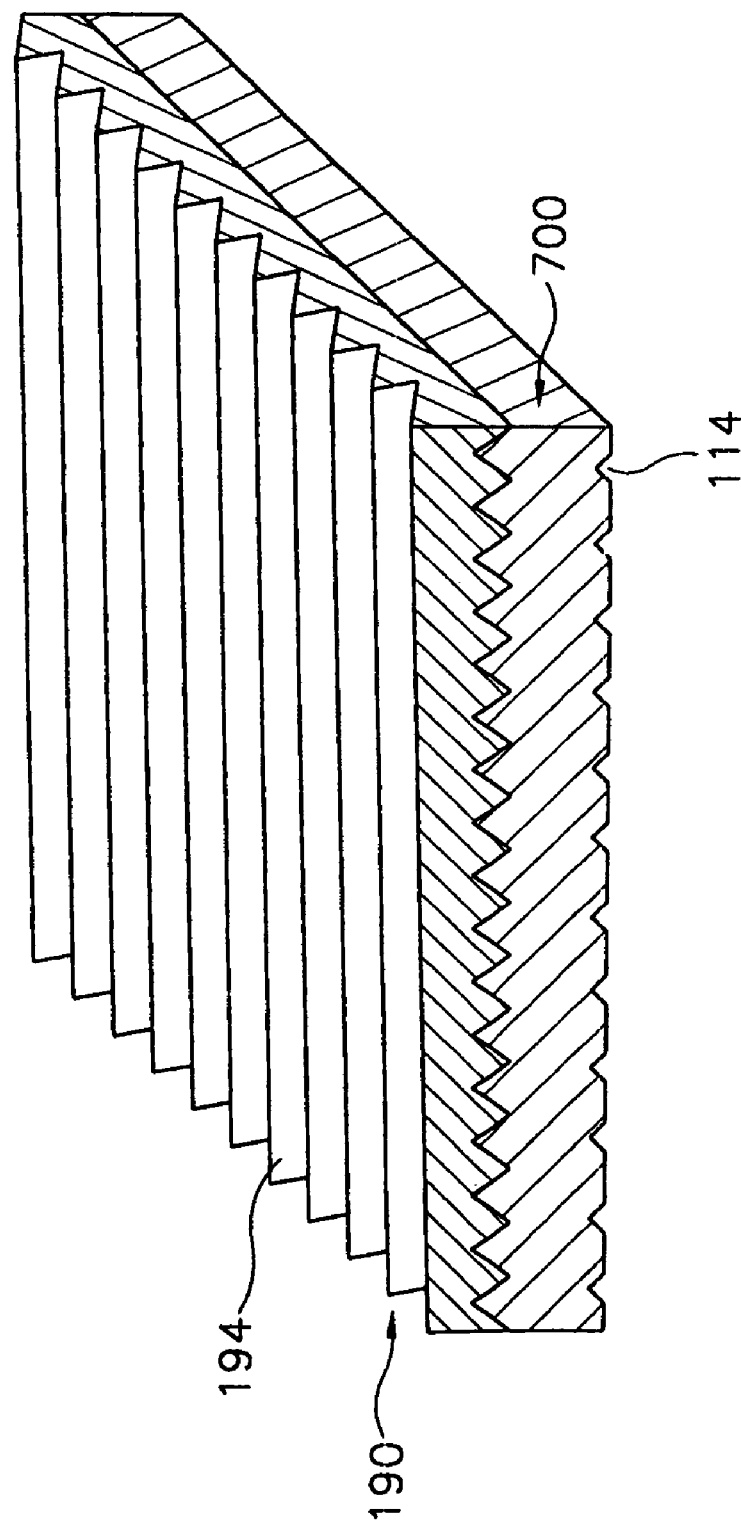

In a state that the upper mold 890 is coupled to the lower mold 880, a material 190a for the formation of the brightness concentration light guiding plate 190 is injected into a space between the upper mold 890 and the lower mold 880 as shown in FIG. 23A. Through the above process, the brightness concentration light guiding plate 190 is integrally formed as one body with the light guiding plate 700 on the light guiding plate 700 as shown in FIG. 23B.

At this time, the material 190a for the formation of the brightness concentration light guiding plate 190 may be the same as a material of the light guiding plate 700 or it may be different from the material of the light guiding plate 700.

Figure 24:
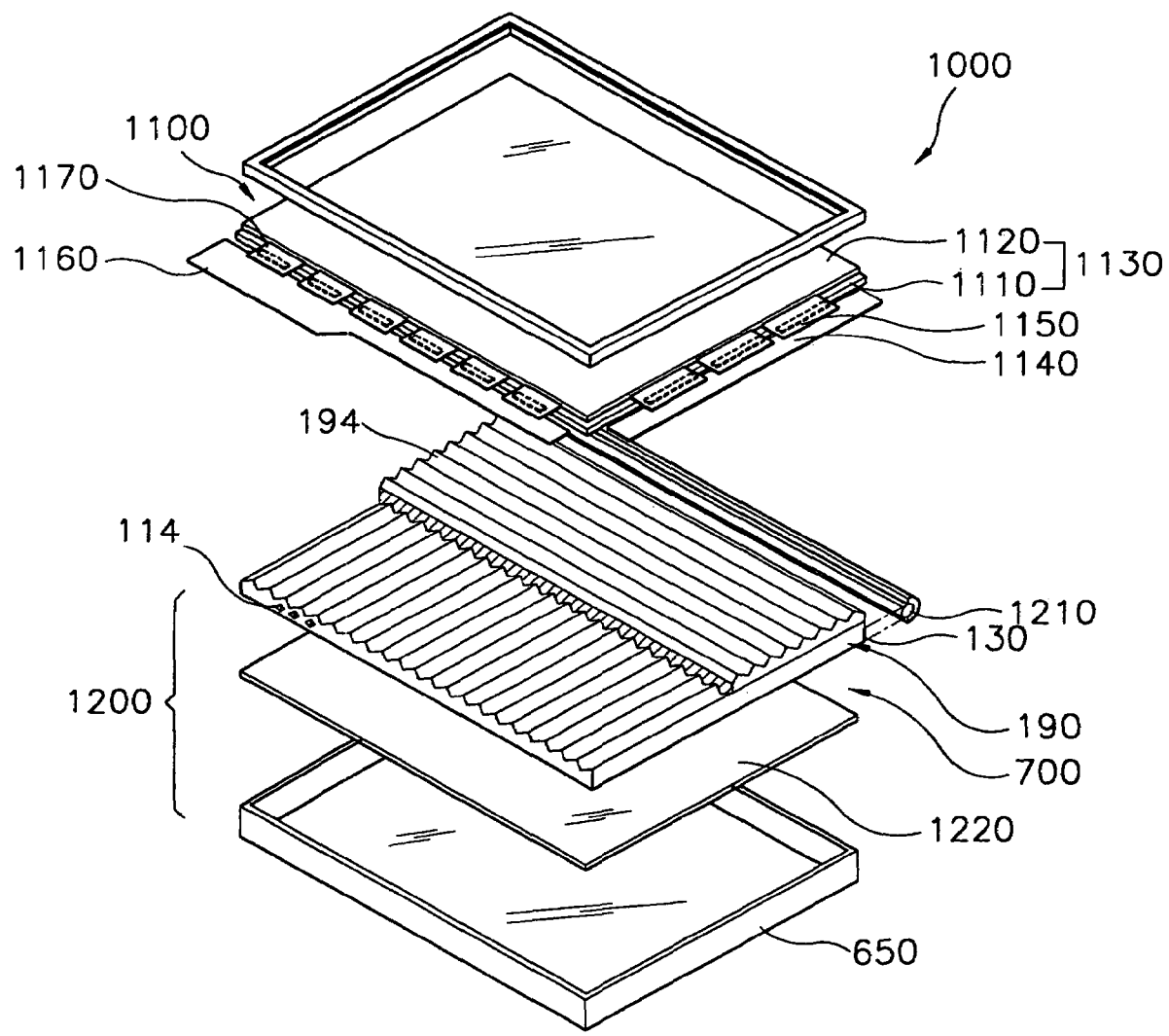
FIG. 24 is an exploded perspective view of an LCD to which the light guiding plate of FIG. 22 is applied.

FIG. 24 is an exploded perspective view of an LCD 1000 to which the light guiding plate 700 having the brightness concentration light guiding plate 190 manufactured by the combination of the first embodiment and the second embodiment is applied.

The LCD 1000 includes an LCD panel assembly 1100 and a backlight assembly 1200 as a whole.

More specifically, the LCD panel assembly 1100 includes: an LCD panel 1130 provided with a TFT substrate 1110, a color filter substrate 1120 and a liquid crystal layer interposed between the TFT substrate 1110 and the color filter substrate 1120; and a driving module 1140, 1150, 1160, 1170 for driving the LCD panel 1130.

Meanwhile, the liquid crystal layer in the LCD panel assembly 1100 functions to vary only the transmittance by an electric field as applied. Such a fact means that a light source should be provided in order to perform a display operation in the LCD panel assembly 1100.

So as to satisfy this request, the backlight assembly 1200 is established below the LCD panel 1130.

The backlight assembly 1200 in accordance with one embodiment of the present invention includes the light guiding plate 700, which is manufactured by the combination of the first embodiment and the second embodiment, a lamp assembly 1210 for providing the light incident face 130 of the light guiding plate 700 with a light, a reflection plate 1220 disposed below the light guiding plate 700, for reflecting a leakage light leaked through the light guiding plate 700 and a receiving container 650 for receiving these elements.

Here, if the peak portion of the brightness enhancement protrusion 116 is processed with an acute angle, the brightness enhancement protrusion 116 itself may be damaged or it may damages other components. To this end, the peak portion of the brightness enhancement protrusion 116 is preferably processed to have a round shape.

Meanwhile, the brightness enhancement protrusion 116 minimizes the light amount leaked through the light reflection face 110 of the light guiding plate 700 but it does not shield the leaked light completely.

Considering this fact, a light flection thin film 119 for reflecting light is further formed below the light reflection face 110 in the light guiding plate 700 of the present embodiment.

The light reflection thin film 119 can be made of any material if the material has an excellent light reflectivity. For an example, metal or synthetic resin can be used as the material of the light reflection thin film 119.

In the LCD 1000 to which the light guiding plate 700 manufactured by the combination of the first embodiment and the second embodiment is applied, an optical sheet comprised of a diffusion sheet and a prism sheet may not be disposed between the upper face of the light guiding plate 700 and the LCD panel assembly 1100. This is because the curved side faces 114a to 114d of the brightness enhancement recesses 114 formed in the light reflection face 110 of the light guiding plate 700, the light diffusion recess 114e formed at the side faces 114a to 114d of the brightness enhancement recesses 114, the light concentration pattern 172 formed at the light output face 120 of the light guiding plate 700 and the brightness concentration light guiding plate 190 perform the light diffusion function instead of the diffusion sheet.

Table 3 shows the differences between a constitution of the conventional backlight assembly and that of the backlight assembly provided with the light guiding plate 700 manufactured by the combination of the first embodiment and the second embodiment of the present invention.

TABLE 3

| Conventional Art | Items | 1$^{St}$ Embodiment |
| --- | --- | --- |
| Establish | Prism sheet | Not established |
| Establish | Diffusion plate | Not established |
| Establish (Use of Reflection dots) | Light guiding plate | Establish (Use of curved brightness enhancement recess, light diffusion recess and light concentration pattern) |
| Establish Reference datum value | Reflection plate Brightness | Establish 10% enhancement compared with reference datum value |

Embodiment 3

The aforementioned first and second embodiments describe the light guiding plate 700 functioning to enhance the uniformity and brightness of the light input into the light guiding plate 700 by forming the brightness enhancement recess 114 in the light reflection face, altering shape of the brightness enhancement recess 114, forming the light diffusion recess 114e in the brightness enhancement recess 114 and forming the light concentration pattern 172 in the light output face 120 of the light guiding plate 700.

Then, according to the aforementioned first and second embodiment, most of the light that is incident through the light input face of the light guiding plate 700 is reflected by the brightness enhancement recess formed at the light reflection face but a part of the incident light is not reflected by the light reflection face 110 of the light guiding plate 700 but is leaked through the light reflection face 110, so that lowering in the brightness occurs.

Accordingly, the present embodiment discloses a light guiding plate 700 capable of minimizing a light amount leaked through the light reflection face 110 and allowing all light to be reflected by the light reflection face 110 of the light guiding plate 700 without using the reflection plate.

Referring to FIGS. 13, 14, 25 and 26, in a state that the brightness enhancement recess 114 is formed in the light reflection face 110 of the light guiding plate 700 in a matrix configuration, a brightness enhancement protrusion 116 is formed along a column direction at the surface of the light reflection face 110 between the brightness enhancement recesses 114 arranged in the column direction.

The brightness enhancement protrusion 116 has a polygonal pyramidal shape, preferably, in at least a triangular pyramidal shape. Further, it may have a cone shape.

Figure 26:
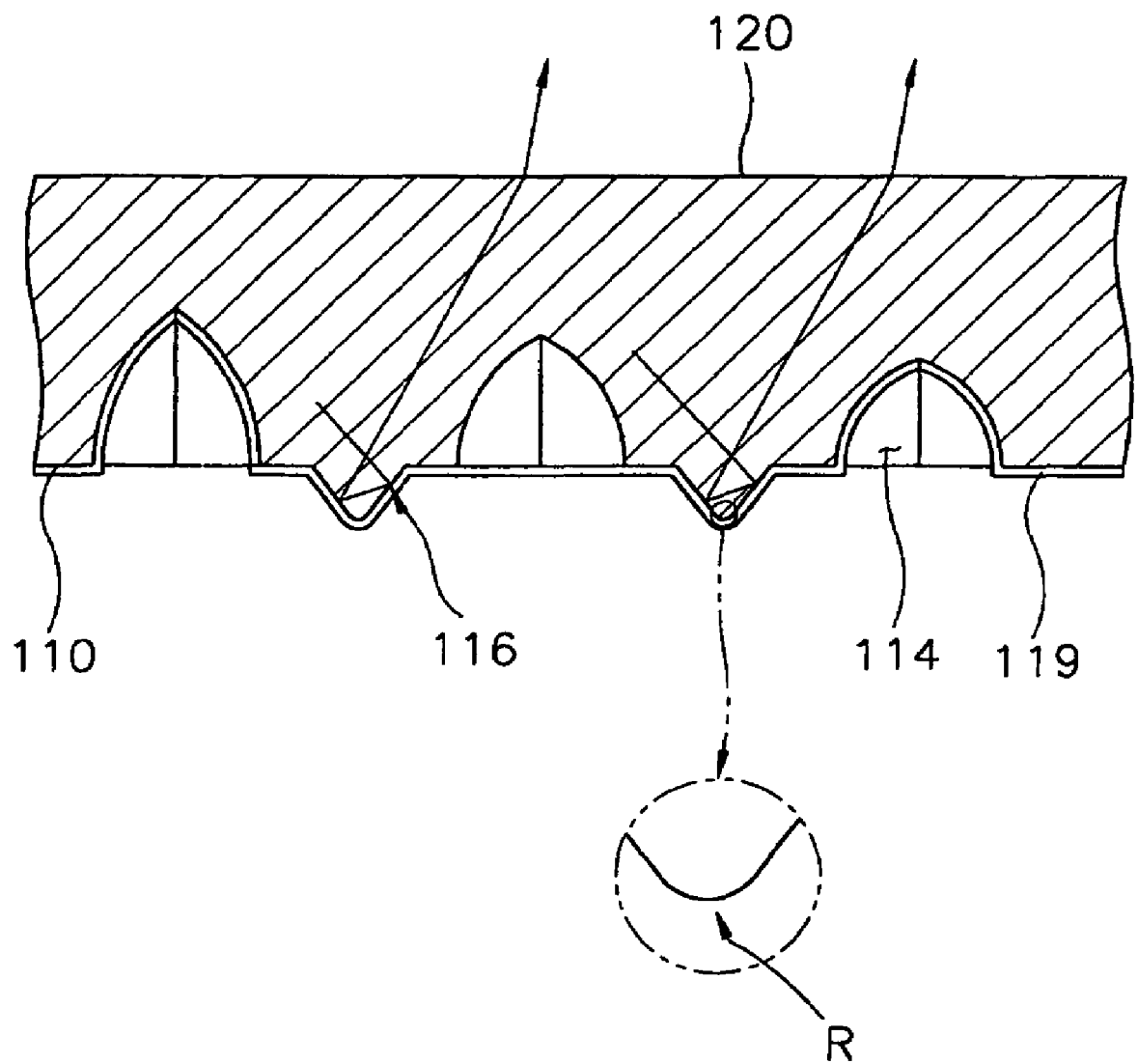
FIG. 26 is a sectional view taken along a line in parallel with a light leakage preventive protrusion and the brightness enhancement recess in FIG. 25.

As shown in FIG. 26, the brightness enhancement protrusion 116 allows an incident light, which is not yet reflected by the brightness enhancement recesses 114 and are leaked, to be reflected by mirror faces of the brightness enhancement protrusion 116 at least one time and to progress toward the light output face 120, thereby preventing the incident light from being leaked to a maximum degree.

Figure 25:
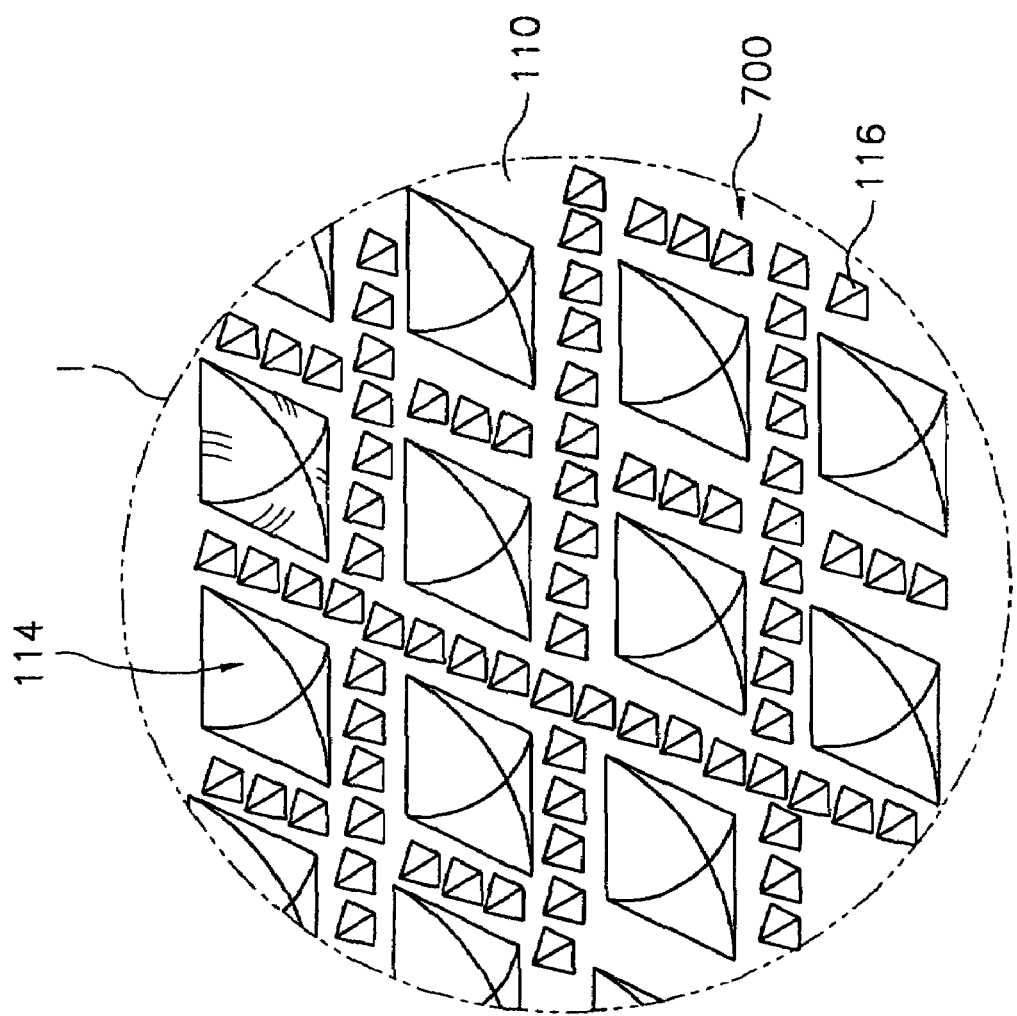
FIG. 25 is an enlarged view of the portion "I" in FIG. 13 in accordance with another embodiment of the present invention.
Figure 27:
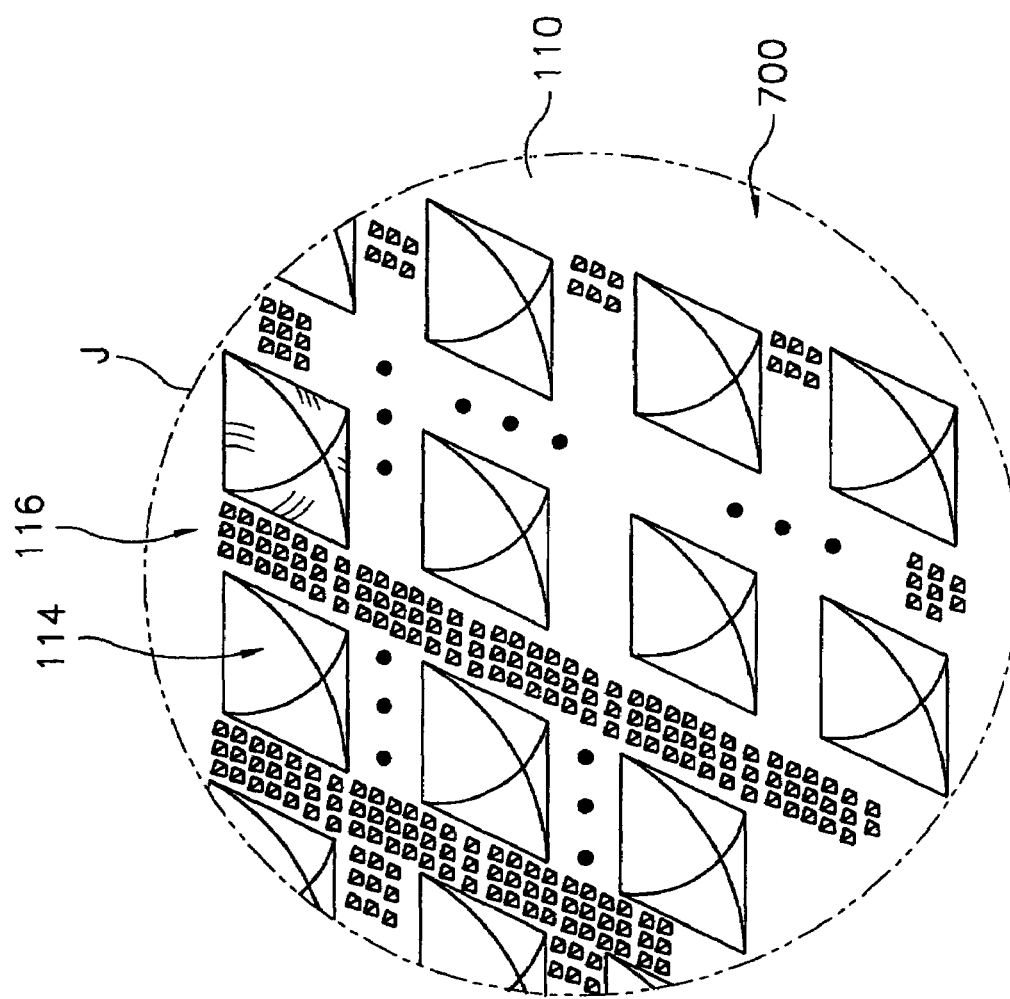
FIG. 27 an enlarged view of the light guiding plate in accordance with another embodiment of the present invention.
Figure 28:
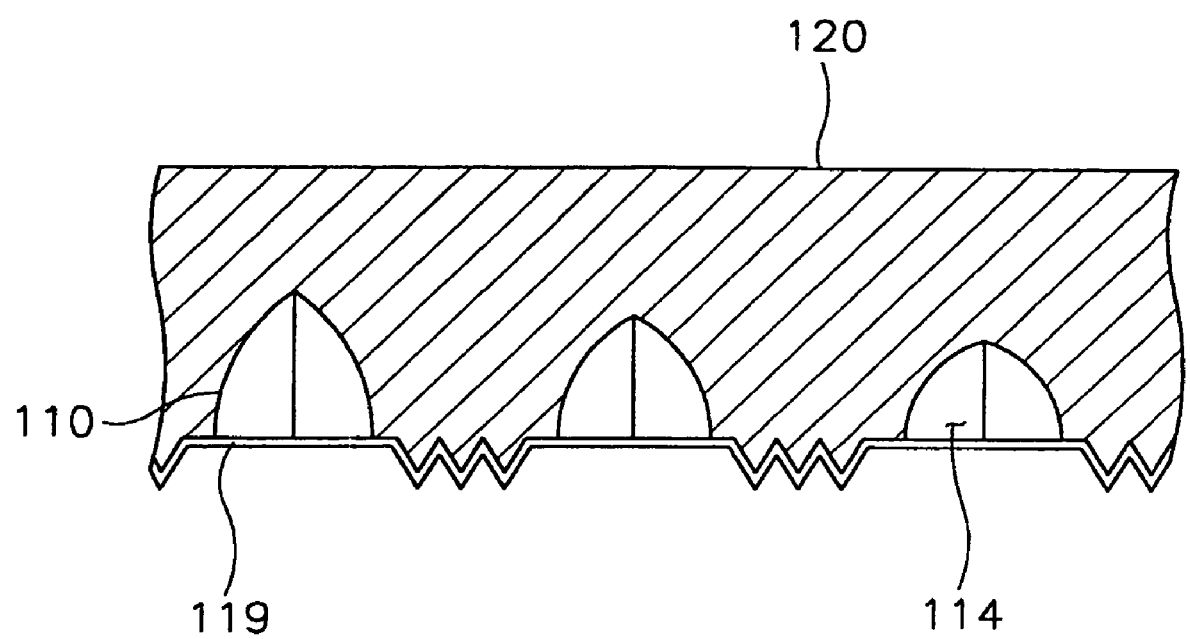
FIG. 28 is a sectional view of the light guiding plate in FIG. 27.

Preferably, this brightness enhancement protrusion 116 is formed between the brightness enhancement recesses 114 arranged in the column direction in one column as shown in FIG. 25 or in at least two columns as shown in FIGS. 27 and 28.

Here, if the peak portion of the brightness enhancement protrusion 116 is processed with an acute angle, the brightness enhancement protrusion 116 itself may be damaged or it may damages other components. To this end, the peak portion of the brightness enhancement protrusion 116 is preferably processed to have a round shape.

Meanwhile, the brightness enhancement protrusion 116 minimizes the light amount leaked through the light reflection face 110 of the light guiding plate 700 but it does not shield the leaked light completely.

Considering this fact, a light reflection thin film 119 for reflecting light is further formed below the light reflection face 110 in the light guiding plate 700 of the present embodiment.

The light reflection thin film 119 can be made of any material if the material has an excellent light reflectivity. For an example, metal or synthetic resin can be used as the material of the light repreduetienreflection thin film 119.

FIGS. 29A to FIG. 29F are sectional views describing a method for forming the brightness enhancement recess 114 and the brightness enhancement protrusion 116 in a light guiding plate.

Figure 29A:
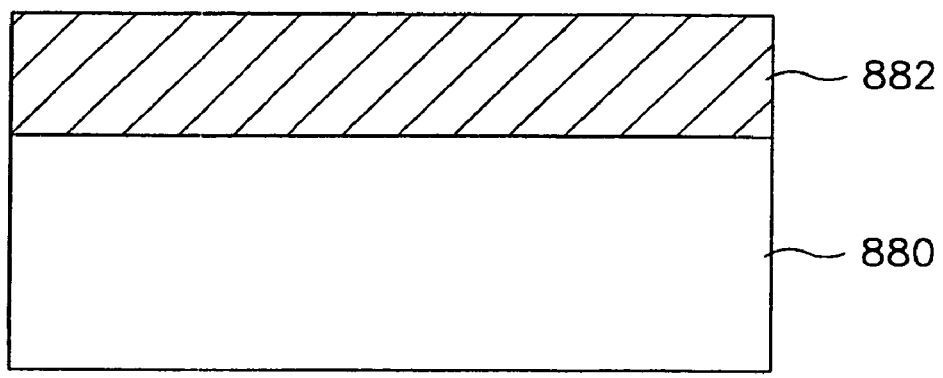
FIGS. 29A through 29F are views illustrating a method for manufacturing the light guiding plate with the light leakage preventive protrusion and the brightness enhancement recess.

Referring to FIG. 29A, a photoresist film 882 is formed on a base substrate 880 5 to a predetermined thickness.

Figure 29B:
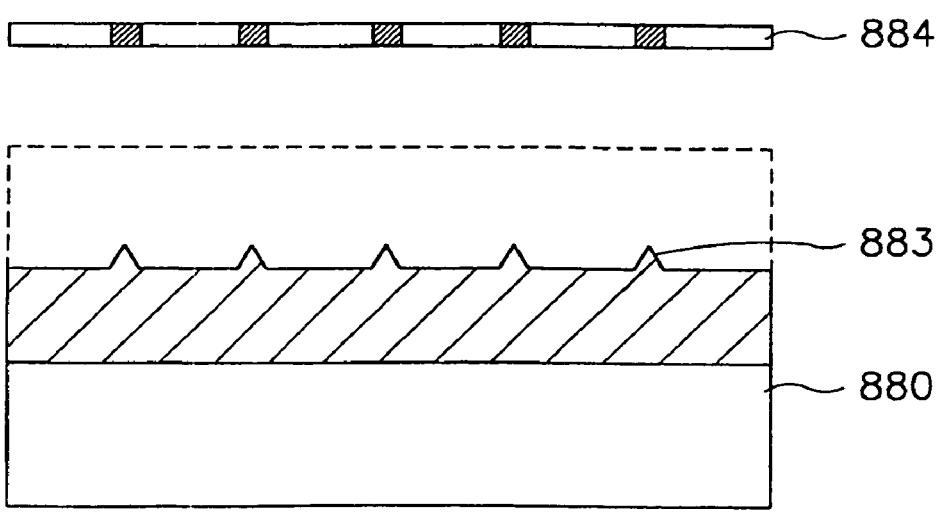

Referring to FIG. 29B, a mask 884 is aligned over the photoresist film 882 and the photoresist film 882 is exposed using the mask 884 such that the light passing through the mask 884 arrives only at a predetermined portion but the light does not arrive at the remaining portion.

At this time, the intensity of the used light is controlled such that a protrusion 883 formed in the photoresist film 882 has the same height as the brightness enhancement protrusion 883.

After that, the exposed portions of the photoresist film 882 are developed, so that the protrusions having the same shape as the brightness enhancement protrusion 883. are formed at the specific positions.

Figure 29C:
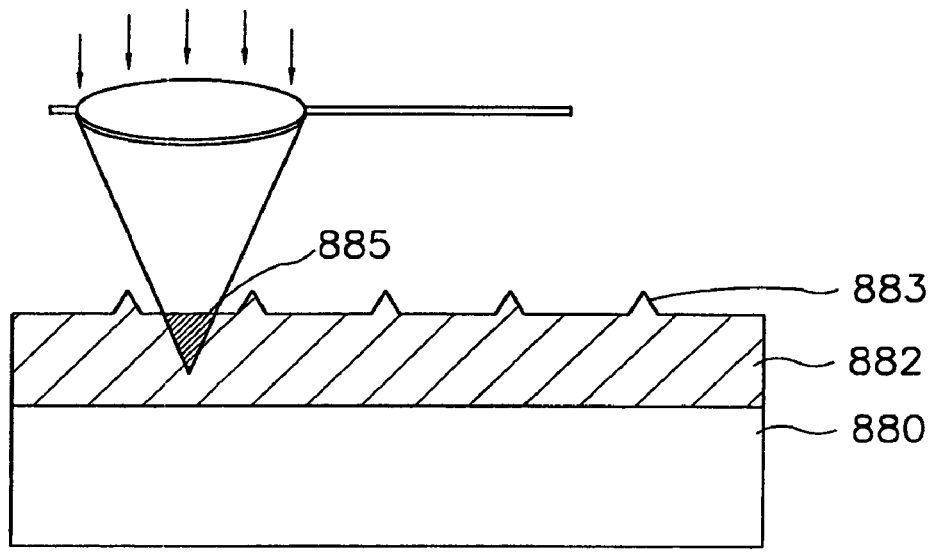

Thereafter, as shown in FIG. 29C, a recess 885 having the same shape and function as the brightness enhancement recess 114 provided in the first embodiment or the second embodiment is formed in the resultant photoresist film 882 having the protrusion 883.

Figure 29D:
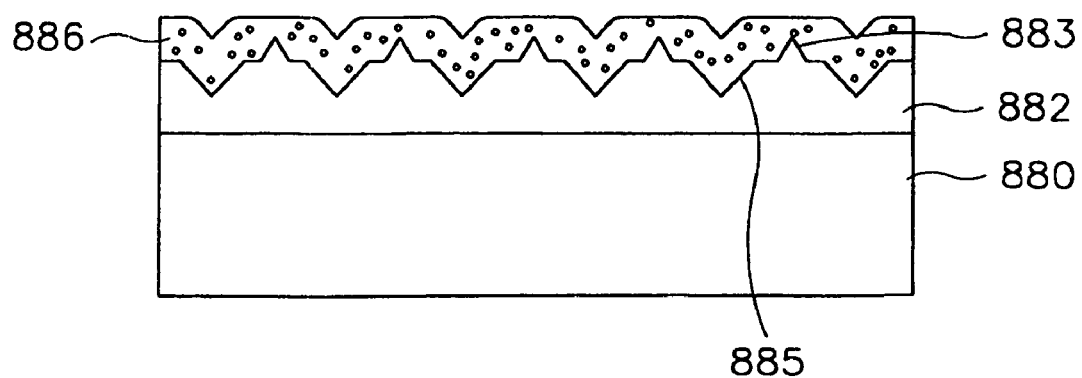

Afterwards, as shown in FIG. 29D, a dense metal film 886 is deposited on the resultant photoresist film 882 having the recess 885 and the protrusion 883. The metal film 886 serves as a metal substrate 886.

Figure 29E:
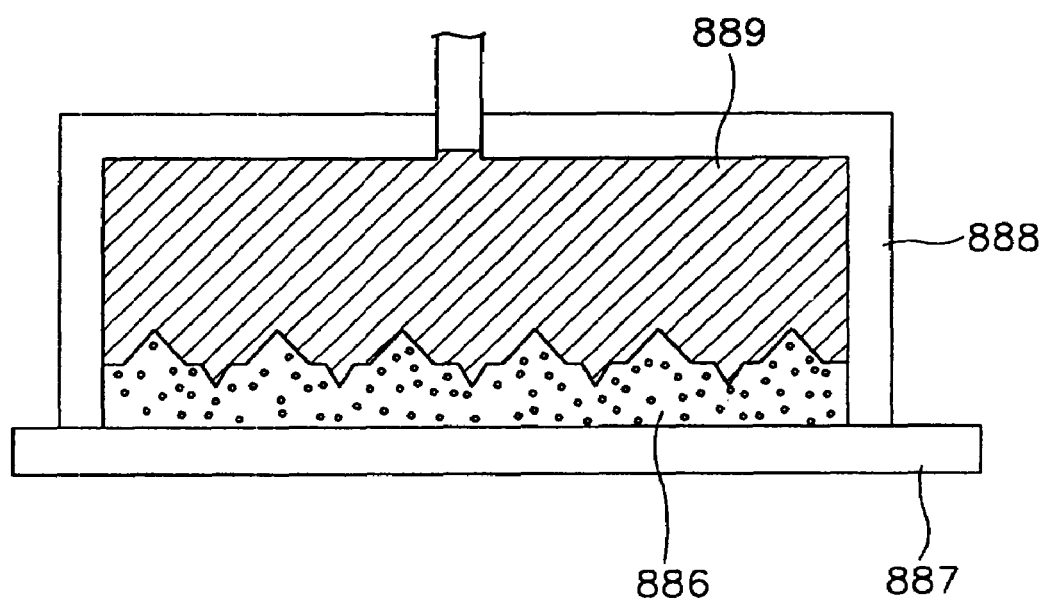

After that, as shown in FIG. 29E, the metal substrate 886 attached on the patterned photoresist film 882 is separated from the photoresist film 882 and is fixed on a selected position of a lower mold 887 such that the metal protrusion pattern 845a is directed upwards.

Figure 29F:
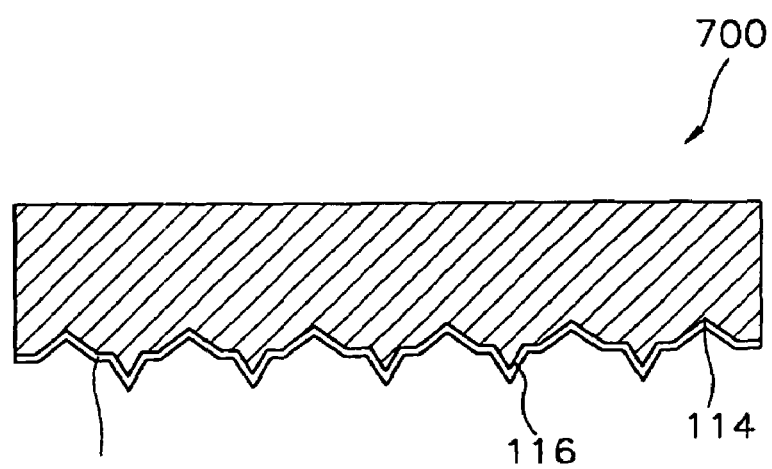

Afterwards, an upper mold 888 is coupled to the lower mold 887. Then, a liquid material 889 for the formation of the light guiding plate 700 is injected into a space between the lower mold 887 and the upper mold 888 through an injection hole of the upper mold 888, as shown in FIG. 29E. As a result of the molding, the light guiding plate 700 is obtained as shown in FIG. 29F. Then, on a surface of the light guiding plate 700, which makes contact with the metal substrate 886 in FIG. 29E, a light reproduction thin film 119 is formed.

Figure 30:
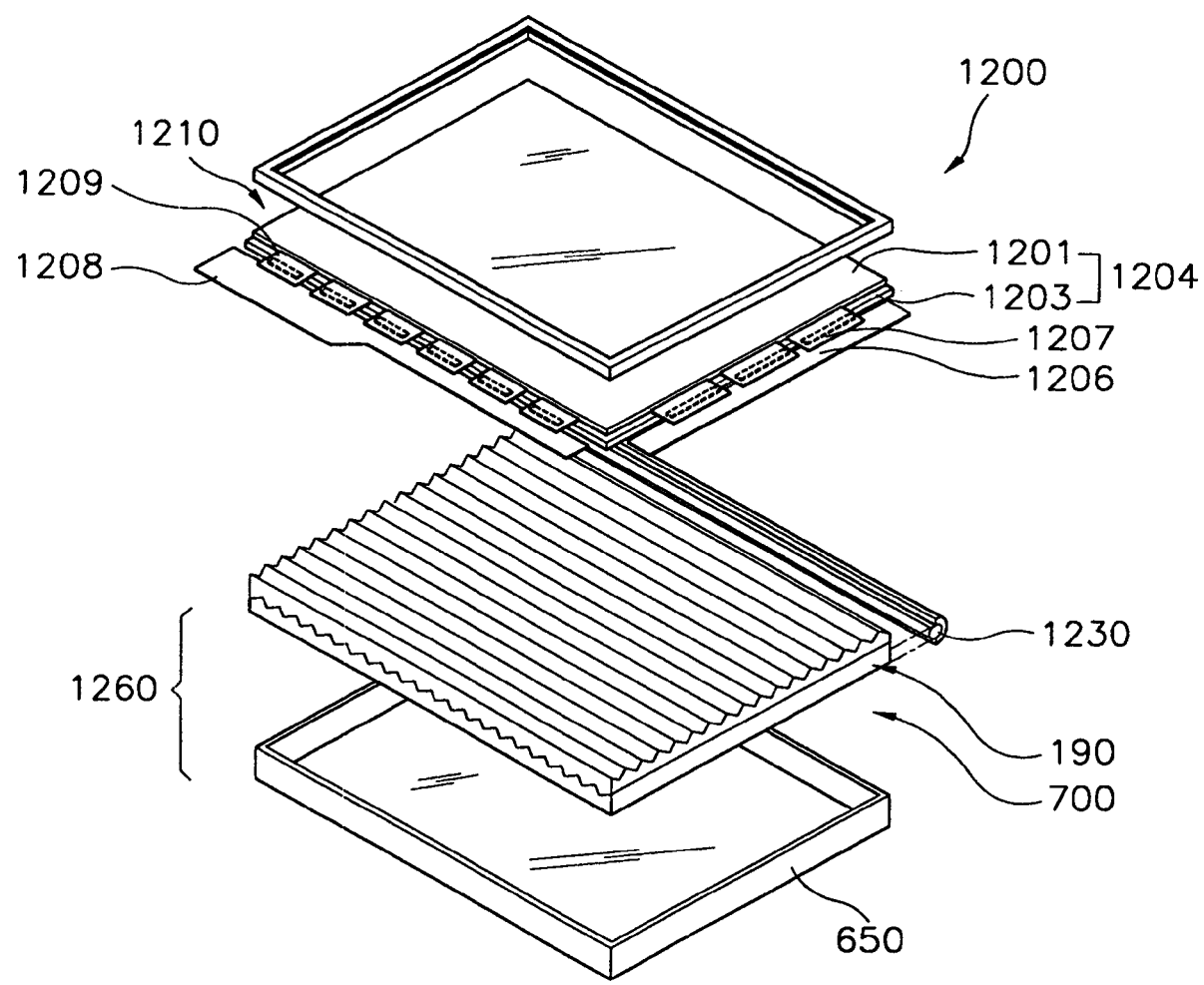
FIG. 30 is an exploded perspective view of an LCD to which the light guiding plate with the light leakage preventive protrusion and the brightness enhancement recess.

FIG. 30 is an exploded perspective view of an LCD 1200 to which the light guiding plate 700 manufactured by the combination of the first embodiment to the third embodiment is applied.

Referring to FIG. 30, the LCD 1200 includes an LCD panel assembly 1210 and a backlight assembly 1260 as a whole.

More specifically, the LCD panel assembly 1210 includes: an LCD panel 1204 provided with a TFT substrate 1201, a color filter substrate 1203 and a liquid crystal layer interposed between the TFT substrate 1201 and the color filter substrate 1203; and a driving module 1206, 1207, 1208, 1209 for driving the LCD panel 1204.

Meanwhile, the liquid crystal layer in the LCD panel assembly 1210 functions to vary only the transmittance by an electric field as applied. Such a fact means that a light source should be provided in order to perform a display operation in the LCD panel assembly 1210.

So as to satisfy this request, the backlight assembly 1260 is established below the LCD panel 1204.

The backlight assembly 1206 in accordance with the third embodiment of the present invention includes the light guiding plate 700 with the light concentration pattern formed at the light output face, the brightness enhancement recess 114 formed at the light reflection face and the light diffusion recess, and a lamp assembly 1230 for providing the light incident face 130 of the light guiding plate 700 with a light. There is also included a receiving container 650 for receiving all these elements.

In the LCD 1200 to which the light guiding plate 700 manufactured by the combination of the first embodiment to the third embodiment is applied, the reflection plate as well as an optical sheet comprised of a diffusion sheet and a prism sheet might not be disposed on the upper face of the light guiding plate 700 or below the bottom face of the light guiding plate 700 in order to display an image with high and uniform brightness.

This is because the curved side faces 114a to 114d of the brightness enhancement recess 114 formed in the light reflection face 110 of the light guiding plate 700, the light diffusion recess 114e formed at the side faces 114a to 114d of the brightness enhancement recess 114, the light concentration pattern 172 formed at the light output face 120 of the light guiding plate 700, the brightness concentration light guiding plate 190 and the light reproduction thin film 119 formed at the light reflection face of the light guiding plate 700 perform the light diffusion and reflection functions instead of the optical sheet and the reflection plate, as described in the first to third embodiments.

Table 4 shows differences between a constitution of the conventional backlight assembly and that of the backlight assembly provided with the light guiding plate 700 manufactured by the combination of the first embodiment to the third embodiments of the present invention.

TABLE 4

| Conventional Art | Items | 1st Embodiment |
|---|---|---|
| Establish | Prism sheet | Not established |
| Establish | Diffusion plate | Not established |
| Establish (Use of Reflection dots) | Light guiding plate | Establish (Use of curved brightness enhancement recess, light diffusion recess, light concentration pattern, brightness enhancement protrusion and light reproduction thin film) |
| Establish | Reflection plate | Not established |
| Reference datum value | Brightness | 10% enhancement compared with reference datum value |

According to Table 4, in the case that the light guiding plate 700 manufactured by the combination of the first embodiment to third embodiments disclosed above is used, the prism sheet, the diffusion sheet and the reflection plate are unnecessary, so that the thickness of the LCD is substantially decreased.

Also, the brightness enhancement recess 114, the light diffusion recess, the light concentration pattern, the brightness enhancement protrusion 116 and the light reproduction film 119 formed in the light guiding plate 700 minimize the light loss, so that brightness is enhanced by about 10% or more in comparison with the conventional backlight assembly.

As described above, the present invention changes the structure of the light guiding plate 700, to thereby enhance brightness of the light supplied to the LCD panel assembly 1210 to a considerable degree. Also, uniformity in the light is considerably enhanced.

Further, the light guiding plate 700 of the present invention does not require the diffusion sheet for enhancing the uniformity in the light supplied into the conventional LCD assembly, so that an LCD, which is slimmer in thickness, lighter in weight, simplified in the assembly process, and decreased in the number of the elements may be obtained.

Furthermore, the light guiding plate 700 of the present invention does not require the reflection plate for reproducing the light leaked through the conventional light guiding plate, so that an LCD, which is slimmer in thickness, lighter in weight, simplified in the assembly process, and decreased in the number of the elements may be obtained.

Moreover, the light guiding plate 700 of the present invention does not require any of the diffusion sheet, the prism sheet and the reflection plate, so that an LCD, which is slimmer in thickness, lighter in weight, simplified in the assembly process, and decreased in the number of the elements may be obtained.

Also, the light guiding plate 700 of the present invention does not require the optical sheets, so that production costs are decreased substantially.

While the present invention and its advantages have been described in detail, it should be understood that various changes, substitutions and alterations can be made herein without departing from the spirit and scope of the invention as defined by the appended claims.

What is claimed is:

1. A liquid crystal display, comprising:
   a liquid crystal display panel assembly for displaying an image by controlling a liquid crystal layer; and
   a backlight assembly including:
   (i) a lamp assembly for supplying a first light;
   (ii) a light guiding plate comprising:
      a light input face into which the first light is input;
      at least two light guiding plate side faces;
      a light reflection face that is adjacent to the light input face and the light guiding plate side faces, the light reflection face having at least one brightness enhancement recess and at least one brightness enhancement protrusion, wherein the brightness enhancement recess reflects at least a second light that is reflected by the light guiding plate side faces toward the liquid crystal display panel assembly to enhance brightness, wherein the brightness enhancement protrusion formed on at a surface thereof to reflect a light leaked through the light reflection face toward the liquid crystal display panel assembly to reproduce the leaked light; and
      a light output face allowing the light to be outputted from the light reflection face and having a brightness concentration pattern formed in the light output face.

2. The liquid crystal display of claim 1, further comprising a light concentration light guiding plate including a first auxiliary light concentration pattern and a second auxiliary light concentration pattern,
   wherein the first auxiliary light concentration pattern is formed at a bottom face of the light concentration light guiding plate in the first direction and fitted to engage with the brightness concentration pattern of the light guiding plate, and
   wherein the second auxiliary light concentration pattern is formed at an upper face of the light concentration light guiding plate in a second direction different from the first direction of the first auxiliary light concentration pattern in succession.

3. The liquid crystal display of claim 1, wherein a plurality of the brightness enhancement protrusions are continuously formed between the brightness enhancement recesses.

4. The liquid crystal display of claim 1, wherein the brightness enhancement recess has a polygonal pyramid shape having at lest three recess side faces.

5. The liquid crystal display of claim 4, wherein the brightness enhancement recess has at least one light diffusion recess formed at the recess side faces to have a predetermined depth.

6. The liquid crystal display of claim 4, wherein the recess side faces are curved such that the second light is diffused while the second light is reflected.

7. A liquid crystal display, comprising:
   a liquid crystal display panel assembly for displaying an image by controlling a liquid crystal layer; and
   a backlight assembly including:
   (i) a lamp assembly for supplying a first light;
   (ii) a light guiding plate comprising;
      a light input face into which the first light is input;
      at least two light guiding plate side faces;
      a light reflection face that is adjacent to the light input face and the light guiding plate side faces, the light reflection face having at least one brightness enhancement recess, wherein the brightness enhancement recess has a plurality of recess side faces respectively facing the light input face and the light guiding plate side faces; and
      a light output face facing the light reflection face, the light output face allowing lights to be output from the brightness enhancement recess,
   wherein the brightness enhancement recess reflects a second light that is reflected by the light guiding plate side faces and a light that is input through the light input face toward the light output face to enhance brightness;

(iii) a light path control film facing the light output face; and (iv) a reflection plate formed below the light guiding plate;

wherein the light reflection face further has at least one brightness enhancement protrusion, the brightness enhancement protrusion formed on at a surface thereof to reflect a light leaked through the light reflection face toward the liquid crystal display panel assembly to reproduce the leaked light.

8. The liquid crystal display of claim 7, wherein a plurality of the brightness enhancement protrusions are continuously formed between the brightness enhancement recesses.

9. A liquid crystal display, comprising:

a liquid crystal display panel assembly for displaying an image by controlling a liquid crystal layer; and a backlight assembly including;

(i) a lamp assembly for supplying a first light;

(ii) a light guiding plate comprising:

a light input face into which the first light is input;

at least two light guiding plate side faces;

a light reflection face that is adjacent to the light input face and the light guiding elate side faces, the light reflection face having at least one brightness enhancement recess, wherein the brightness enhancement recess has a plurality of recess side faces respectively facing the light input face and the light guiding plate side faces; and a light output face facing the light reflection face, the light output face allowing lights to be output from the brightness enhancement recess, wherein the brightness enhancement recess reflects a second light that is reflected by the light guiding plate side faces and a light that is input through the light input face toward the light output face to enhance brightness;

(iii) a light path control film facing the light output face; and (iv) a reflection plate formed below the light guiding plate;

wherein the light output face has a brightness enhancement light guiding plate formed on a surface thereof, the brightness enhancement light guiding plate having:

at least one first brightness enhancement pattern on a first face of the brightness enhancement light guiding plate, the first brightness enhancement pattern being fitted to engage with the output face and being formed repeatedly in a first direction with a prism shape; and a second brightness enhancement pattern on a second face of the brightness enhancement light guiding plate, the second brightness enhancement pattern light output face being arranged in a second direction different from the first direction.

* * * * *